(12) United States Patent
Chen et al.

(10) Patent No.: US 8,164,840 B2
(45) Date of Patent: Apr. 24, 2012

(54) PHOTOGRAPHING OPTICAL LENS ASSEMBLY

(75) Inventors: Chun Shan Chen, Taichung (TW); Dung-Yi Hsieh, Taichung (TW); Tsung-Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 22 days.

(21) Appl. No.: 12/846,374

(22) Filed: Jul. 29, 2010

(65) Prior Publication Data

US 2011/0279910 A1 Nov. 17, 2011

(30) Foreign Application Priority Data

May 11, 2010 (TW) .............................. 99114919 A

(51) Int. Cl.
*G02B 9/12* (2006.01)
*G02B 3/02* (2006.01)
*G02B 9/14* (2006.01)

(52) U.S. Cl. .................. 359/784; 359/716; 359/785

(58) Field of Classification Search .................. 359/716, 359/784, 785, 791, 792
See application file for complete search history.

(56) References Cited

U.S. PATENT DOCUMENTS

| 7,525,741 | B1 | 4/2009 | Noda |
| 7,564,635 | B1 | 7/2009 | Tang |
| 7,907,356 | B2 * | 3/2011 | Isono ........................... 359/785 |

* cited by examiner

*Primary Examiner* — Jack Dinh
(74) *Attorney, Agent, or Firm* — Morris Manning & Martin LLP; Tim Tingkang Xia, Esq.

(57) ABSTRACT

This invention provides a photographing optical lens assembly comprising, in order from an object side to an image side: a first lens element with positive refractive power having a convex object-side surface; a second lens element with negative refractive power having a concave object-side surface and a concave image-side surface, the object-side and image-side surfaces thereof being aspheric; a third lens element having a concave image-side surface, the object-side and image-side surfaces thereof being aspheric, at least one inflection point formed on the image-side surface; wherein there are three lens elements with refractive power. Such an arrangement of lens elements can effectively reduce the total track length of the lens assembly, attenuate the sensitivity of the optical system and obtain higher resolution.

25 Claims, 20 Drawing Sheets

| TABLE 1 | | | | | | |
|---|---|---|---|---|---|---|
| (Embodiment 1) | | | | | | |
| f = 2.18 mm, Fno = 2.48, HFOV = 35.1 deg. | | | | | | |
| Surface # | | Curvature Radius | Thickness | Material | Index | Abbe # | Focal length |
| 0 | Object | Plano | Infinity | | | | |
| 1 | Stop | Plano | -0.120 | | | | |
| 2 | Lens 1 | 0.792830 (ASP) | 0.381 | Plastic | 1.544 | 55.9 | 2.01 |
| 3 | | 2.399930 (ASP) | 0.123 | | | | |
| 4 | | Plano | 0.108 | | | | |
| 5 | Lens 2 | -4.101800 (ASP) | 0.537 | Plastic | 1.632 | 23.4 | -2.23 |
| 6 | | 2.256410 (ASP) | 0.171 | | | | |
| 7 | Lens 3 | 0.729350 (ASP) | 0.594 | Plastic | 1.544 | 55.9 | 2.75 |
| 8 | | 1.013500 (ASP) | 0.300 | | | | |
| 9 | IR-filter | Plano | 0.300 | Glass | 1.517 | 64.2 | - |
| 10 | | Plano | 0.184 | | | | |
| 11 | Image | Plano | - | | | | |
| Notes: Clear aperture diameter on surface #4 is 0.85mm | | | | | | | |

Fig. 6

| TABLE 2A | | | | |
|---|---|---|---|---|
| Aspheric Coefficients | | | | |
| Surface # | 2 | 3 | 5 | 6 |
| k = | -1.70311E+00 | -4.60139E+00 | -4.39840E-01 | -5.00000E+01 |
| A4 = | 2.48871E-01 | 1.42068E-01 | 4.34505E-01 | -1.21764E+00 |
| A6 = | 4.00993E+00 | -3.79870E+00 | -4.08395E+01 | 4.18994E+00 |
| A8 = | -3.79966E+01 | 3.61232E+01 | 6.99751E+02 | -5.69601E+00 |
| A10= | 2.35191E+02 | -1.93953E+02 | -6.07924E+03 | -2.77738E+00 |
| A12 = | -8.91729E+02 | 2.17410E+02 | 2.56892E+04 | 1.59050E+01 |
| A14= | 1.41526E+03 | | -4.33714E+04 | -1.15845E+01 |

Fig. 7A

| TABLE 2B | | |
|---|---|---|
| Aspheric Coefficients | | |
| Surface # | 7 | 8 |
| k = | -6.09970E+00 | -5.56400E-01 |
| A1 = | | |
| A2 = | | |
| A3 = | | |
| A4 = | -6.64433E-01 | -8.13853E-01 |
| A5 = | | |
| A6 = | 6.06849E-01 | 6.99534E-01 |
| A7 = | | |
| A8 = | -8.81356E-02 | -5.75264E-01 |
| A9 = | | |
| A10= | -3.22493E-01 | 2.80439E-01 |
| A11= | | |
| A12= | 1.85218E-01 | -6.57493E-02 |
| A13= | | |
| A14= | | -3.19158E-04 |
| A15= | | |
| A16= | | 8.95229E-04 |

Fig. 7B

| TABLE 3 | | | | | | |
|---|---|---|---|---|---|---|
| (Embodiment 2) | | | | | | |
| f = 1.99 mm, Fno = 2.85, HFOV = 37.5 deg. | | | | | | |
| Surface # | | Curvature Radius | Thickness | Material | Index | Abbe # | Focal length |
| 0 | Object | Plano | Infinity | | | | |
| 1 | Lens 1 | 0.877350 (ASP) | 0.422 | Plastic | 1.544 | 55.9 | 1.98 |
| 2 | | 3.931000 (ASP) | 0.039 | | | | |
| 3 | Stop | Plano | 0.310 | | | | |
| 4 | Lens 2 | -4.025300 (ASP) | 0.382 | Plastic | 1.632 | 23.4 | -2.21 |
| 5 | | 2.218950 (ASP) | 0.177 | | | | |
| 6 | Lens 3 | 0.640490 (ASP) | 0.485 | Plastic | 1.544 | 55.9 | 2.35 |
| 7 | | 0.942690 (ASP) | 0.200 | | | | |
| 8 | IR-filter | Plano | 0.300 | Glass | 1.517 | 64.2 | - |
| 9 | | Plano | 0.209 | | | | |
| 10 | Image | Plano | - | | | | |

Fig. 8

| TABLE 4A | | | | |
|---|---|---|---|---|
| Aspheric Coefficients | | | | |
| Surface # | 1 | 2 | 4 | 5 |
| k = | -2.18731E+00 | -4.86227E+01 | -1.00000E+00 | -5.00000E+01 |
| A4 = | 1.48051E-01 | -1.99600E-01 | 1.20791E-01 | -1.45607E+00 |
| A6 = | 3.13800E+00 | -5.42464E-01 | -4.08589E+01 | 4.12259E+00 |
| A8 = | -4.13522E+01 | -1.74057E+01 | 6.92826E+02 | -6.04044E+00 |
| A10= | 2.54125E+02 | 6.17799E+01 | -6.06671E+03 | -3.38765E+00 |
| A12= | -7.86615E+02 | 2.16076E+02 | 2.56976E+04 | 1.57689E+01 |
| A14= | 9.16575E+02 | 8.19740E+00 | -4.34351E+04 | -9.37542E+00 |

Fig. 9A

| TABLE 4B | | |
|---|---|---|
| Aspheric Coefficients | | |
| Surface # | 6 | 7 |
| k = | -4.76659E+00 | -6.14168E-01 |
| A1 = | | |
| A2 = | | |
| A3 = | | |
| A4 = | -5.02739E-01 | -8.14367E-01 |
| A5 = | | |
| A6 = | 3.41249E-01 | 6.26996E-01 |
| A7 = | | |
| A8 = | -1.36671E-02 | -5.62864E-01 |
| A9 = | | |
| A10= | -2.63154E-01 | 2.82081E-01 |
| A11= | | |
| A12= | 1.53493E-01 | -5.97919E-02 |
| A13= | | |
| A14= | -1.99001E-03 | 9.86130E-03 |
| A15= | | |
| A16= | -6.20318E-03 | -7.31133E-03 |

Fig. 9B

| TABLE 5 | | | | | | |
|---|---|---|---|---|---|---|
| (Embodiment 3) | | | | | | |
| f = 2.41 mm, Fno = 2.48, HFOV = 32.6 deg. | | | | | | |
| Surface # | | Curvature Radius | Thickness | Material | Index | Abbe # | Focal length |
| 0 | Object | Plano | Infinity | | | | |
| 1 | Stop | Plano | -0.200 | | | | |
| 2 | Lens 1 | 0.695780 (ASP) | 0.433 | Plastic | 1.544 | 55.9 | 1.86 |
| 3 | | 1.743700 (ASP) | 0.152 | | | | |
| 4 | | Plano | 0.146 | | | | |
| 5 | Lens 2 | -1.423450 (ASP) | 0.416 | Plastic | 1.632 | 23.4 | -2.13 |
| 6 | | 26.630200 (ASP) | 0.141 | | | | |
| 7 | Lens 3 | 0.947900 (ASP) | 0.502 | Plastic | 1.544 | 55.9 | 3.85 |
| 8 | | 1.408270 (ASP) | 0.200 | | | | |
| 9 | IR-filter | Plano | 0.200 | Glass | 1.517 | 64.2 | - |
| 10 | | Plano | 0.100 | | | | |
| 11 | Cover-glass | Plano | 0.400 | Glass | 1.517 | 64.2 | - |
| 12 | | Plano | 0.122 | | | | |
| 13 | Image | Plano | - | | | | |
| Notes: Clear aperture diameter on surface #4 is 0.85mm | | | | | | | |

Fig. 10

| TABLE 6A | | | | | |
|---|---|---|---|---|---|
| Aspheric Coefficients | | | | | |
| Surface # | 2 | 3 | 5 | 6 | 7 |
| k = | -1.17652E+00 | -2.47360E+00 | 2.25677E+00 | 8.00000E+00 | -1.07189E+01 |
| A4 = | 3.78856E-01 | 3.83934E-01 | 1.06451E+00 | -1.29153E+00 | -6.04783E-01 |
| A6 = | 2.98885E+00 | 7.55691E-01 | -4.81476E+01 | 4.03253E+00 | 5.88062E-01 |
| A8 = | -2.72127E+01 | 2.47864E+00 | 7.46691E+02 | -4.69694E+00 | -2.32571E-01 |
| A10= | 2.23550E+02 | -3.08015E+01 | -6.18203E+03 | -3.78219E+00 | 5.47331E-02 |
| A12 = | -8.92072E+02 | 2.17367E+02 | 2.56892E+04 | 1.79086E+01 | -1.12411E-02 |
| A14= | 1.41387E+03 | | -4.33717E+04 | -1.46518E+01 | |

Fig. 11A

| TABLE 6B | |
|---|---|
| Aspheric Coefficients | |
| Surface # | 8 |
| k = | -1.44980E+00 |
| A1 = | |
| A2 = | |
| A3 = | |
| A4 = | -5.83371E-01 |
| A5 = | |
| A6 = | 5.58191E-01 |
| A7 = | |
| A8 = | -5.50442E-01 |
| A9 = | |
| A10= | 3.10540E-01 |
| A11= | |
| A12= | -3.81968E-02 |
| A13= | |
| A14= | -5.18702E-02 |
| A15= | |
| A16= | 1.97421E-02 |

Fig. 11B

| TABLE 7 |||||||
|---|---|---|---|---|---|---|
| (Embodiment 4) |||||||
| f = 1.11 mm, Fno = 2.04, HFOV = 32.1 deg. |||||||
| Surface # | | Curvature Radius | Thickness | Material | Index | Abbe # | Focal length |
| 0 | Object | Plano | Infinity | | | | |
| 1 | Stop | Plano | -0.030 | | | | |
| 2 | Lens 1 | 0.982860 (ASP) | 0.284 | Plastic | 1.535 | 56.3 | 2.26 |
| 3 | | 4.726800 (ASP) | 0.141 | | | | |
| 4 | Lens 2 | -9.279100 (ASP) | 0.323 | Plastic | 1.535 | 56.3 | -13.95 |
| 5 | | 38.446400 (ASP) | 0.169 | | | | |
| 6 | Lens 3 | 0.319130 (ASP) | 0.250 | Plastic | 1.535 | 56.3 | 1.53 |
| 7 | | 0.379870 (ASP) | 0.500 | | | | |
| 8 | Image | Plano | - | | | | |

Fig. 12

| TABLE 8 ||||||
|---|---|---|---|---|---|
| Aspheric Coefficients ||||||
| Surface # | 2 | 3 | 4 | 5 | 6 | 7 |
| k = | -9.80619E-01 | 0.00000E+00 | -2.00000E+01 | -2.00000E+01 | -3.58285E+00 | -1.02514E+00 |
| A4 = | 4.31985E-02 | -3.37453E-01 | -8.88403E-01 | -7.14512E+00 | 1.01790E+00 | -2.98518E+00 |
| A6 = | -3.94313E+00 | 1.32988E+01 | 2.02980E+00 | 4.95374E+01 | -2.04068E+01 | -4.81817E-01 |
| A8 = | 1.61361E+01 | -2.40399E+02 | 2.99519E+01 | -1.81025E+02 | 6.30715E+01 | 1.32190E+01 |
| A10= | 1.64398E+02 | 1.89899E+03 | -6.57359E+02 | -1.82668E+02 | -9.88266E+01 | -2.16529E+01 |
| A12 = | -2.54569E-02 | 5.05107E+03 | 6.45844E+03 | 2.10835E+03 | 2.82182E+01 | -1.23799E+01 |
| A14= | -6.61656E-02 | -8.06701E+04 | 6.52938E+03 | 7.41529E+03 | | 4.21937E+01 |
| A16= | | | -1.58674E+05 | -3.76325E+04 | | -1.42508E+01 |

Fig. 13

| TABLE 9 | | | | | | |
|---|---|---|---|---|---|---|
| (Embodiment 5) | | | | | | |
| f = 1.18 mm, Fno = 2.04, HFOV = 30.5 deg. | | | | | | |
| Surface # | | Curvature Radius | Thickness | Material | Index | Abbe # | Focal length |
| 0 | Object | Plano | Infinity | | | |
| 1 | Stop | Plano | -0.035 | | | |
| 2 | Lens 1 | 0.998400 (ASP) | 0.344 | Plastic | 1.544 | 55.9 | 1.21 |
| 3 | | -1.716740 (ASP) | 0.146 | | | | |
| 4 | Lens 2 | -0.804380 (ASP) | 0.179 | Plastic | 1.632 | 23.4 | -1.06 |
| 5 | | 4.291800 (ASP) | 0.100 | | | | |
| 6 | Lens 3 | 0.407510 (ASP) | 0.311 | Plastic | 1.544 | 55.9 | 1.00 |
| 7 | | 1.178540 (ASP) | 0.300 | | | | |
| 8 | IR-filter | Plano | 0.200 | Glass | 1.517 | 64.2 | - |
| 9 | | Plano | 0.167 | | | | |
| 10 | Image | Plano | - | | | | |

Fig. 14

| TABLE 10 | | | | | | |
|---|---|---|---|---|---|---|
| Aspheric Coefficients | | | | | | |
| Surface # | 2 | 3 | 4 | 5 | 6 | 7 |
| k = | -3.56862E+00 | -1.00000E+00 | -1.76891E+00 | -1.00000E+00 | -5.01414E+00 | 3.15665E-01 |
| A4 = | -3.85449E-01 | -1.69537E+00 | -8.18018E-01 | -5.31366E+00 | 1.69466E+00 | 1.50807E+00 |
| A6 = | 6.47511E+00 | 2.19269E+01 | 2.10592E+01 | 5.15594E+01 | -1.19615E+01 | -9.09573E+00 |
| A8 = | -2.21676E+02 | -3.93847E+02 | -7.34520E-01 | -1.89267E+02 | 4.91109E+01 | 1.71271E+01 |
| A10= | 1.95698E+03 | 2.79890E+03 | -8.23359E+02 | -5.87755E+01 | -1.37659E+02 | -1.81277E+01 |
| A12 = | -1.30520E+02 | 4.87519E+03 | 7.15188E+03 | 2.83126E+03 | 1.56681E+02 | -8.39746E+00 |
| A14= | -5.78931E+04 | -8.05166E+04 | 5.18308E+03 | 6.12040E+03 | | 2.80340E+01 |
| A16= | | | -1.68667E+05 | -5.26817E+04 | | 6.99158E+00 |

Fig. 15

| TABLE 11 | | | | | | |
|---|---|---|---|---|---|---|
| | | Embodiment 1 | Embodiment 2 | Embodiment 3 | Embodiment 4 | Embodiment 5 |
| f | | 2.18 | 1.99 | 2.41 | 1.11 | 1.18 |
| Fno | | 2.48 | 2.85 | 2.48 | 2.04 | 2.04 |
| HFOV | | 35.1 | 37.5 | 32.6 | 32.1 | 30.5 |
| V1-V2 | | 32.5 | 32.5 | 32.5 | 0.0 | 32.5 |
| |N1-N2| | | 0.088 | 0.088 | 0.088 | 0.000 | 0.088 |
| T12/T23 | | 1.35 | 1.97 | 2.11 | 0.83 | 1.46 |
| CT3/CT2 | | 1.11 | 1.27 | 1.21 | 0.77 | 1.74 |
| R1/R2 | | 0.33 | 0.22 | 0.40 | 0.21 | -0.58 |
| R3/R4 | | -1.82 | -1.81 | -0.05 | -0.24 | -0.19 |
| R5/R6 | | 0.72 | 0.68 | 0.67 | 0.84 | 0.35 |
| |f/f1|+|f/f2|+|f/f3| | | 2.85 | 2.75 | 3.05 | 1.30 | 3.27 |
| y"/Y | $y"_1/Y$ | 0.24 | 0.21 | 0.07 | 0.04 | 0.16 |
| | $y"_2/Y$ | 0.83 | - | 0.75 | - | 0.62 |
| Td/TTL | | 0.74 | 0.75 | 0.69 | 0.70 | 0.64 |
| SL/TTL | | 0.95 | 0.81 | 0.92 | 0.98 | 0.98 |
| TTL/ImgH | | 1.71 | 1.59 | 1.69 | 2.38 | 2.40 |

PHOTOGRAPHING OPTICAL LENS ASSEMBLY

CROSS-REFERENCE TO RELATED APPLICATIONS

This non-provisional application claims priority under 35 U.S.C. §119(a) on Patent Application No(s). 099114919 filed in Taiwan, R.O.C. on May 11, 2010, the entire contents of which are hereby incorporated by reference.

BACKGROUND OF THE INVENTION

1. Field of the Invention

The present invention relates to a photographing optical lens assembly and more particularly, to a compact photographing optical lens assembly used in portable electronics.

2. Description of the Prior Art

In recent years, with the popularity of portable electronics, the demand for compact imaging lenses is increasing, and the sensor of a general photographing camera is none other than CCD (charge coupled device) or CMOS Sensor (Complementary Metal Oxide Semiconductor Sensor). Furthermore, as advanced semiconductor manufacturing technology has allowed the pixel size of sensors to be reduced and electronic products have become more compact and powerful, there is an increasing demand for compact imaging lenses featuring better image quality.

A conventional compact photographing optical lens assembly, in order to reduce manufacturing costs, is usually composed of a two-lens structure, such as a two-lens imaging lens assembly disclosed by U.S. Pat. No. 7,525,741. However, two-lens structure has limited ability in correcting aberrations, which is unable to satisfy the demand of high level imaging modules. On the other hand, utilizing too many lens elements in the assembly will also be difficult for the total track length of the lens assembly to stay compact.

To obtain high image quality while maintaining the compact feature of the lens assembly, photographing optical lens assembly with three lens elements proves to be the solution. U.S. Pat. No. 7,564,635 discloses a photographing optical lens assembly with three lens elements. However, three lens elements of the lens assembly are all positive refractive lens elements, which make it difficult to correct the aberration (such as chromatic aberration) in the system and the image quality is compensated. Therefore, a need exists in the art for a photographing optical lens assembly that features high image quality without having a long total track length and applicable in portable electronic products.

SUMMARY OF THE INVENTION

The present invention provides a photographing optical lens assembly comprising, in order from an object side to an image side: a first lens element with positive refractive power having a convex object-side surface; a second lens element with negative refractive power having a concave object-side surface and a concave image-side surface, the object-side and image-side surfaces thereof being aspheric; and a third lens element having a concave image-side surface, the object-side and image-side surfaces thereof being aspheric, at least one inflection point formed on the image-side surface; wherein there are three lens elements with refractive power, the distance on the optical axis between the first and the second lens elements is T12, the distance on the optical axis between the second and the third lens elements is T23, the thickness on the optical axis of the second lens element is CT2, the thickness on the optical axis of the third lens element is CT3, the radius of curvature on the object-side surface of the first lens element is R1, the radius of curvature on the image-side surface of the first lens element is R2, the radius of curvature on the object-side surface of the second lens element is R3, the radius of curvature on the image-side surface of the second lens element is R4, and they satisfy the relations: $0.40 < T12/T23 < 2.35$; $0.50 < CT3/CT2 < 1.65$; $-2.00 < R1/R2 < 0.50$; $-3.20 < R3/R4 < 0.00$.

According to another aspect of the present invention, a photographing optical lens assembly comprises, in order from the object side to the image side: a first lens element with positive refractive power having a convex object-side surface; a second lens element with negative refractive power having a concave object-side surface and a concave image-side surface, the object-side and image-side surfaces thereof being aspheric; and a third lens element having a concave image-side surface, the object-side and image-side surfaces thereof being aspheric, at least one inflection point formed on the image-side surface; wherein the photographing optical lens assembly further provides an electronic sensor for image formation at an image plane; wherein there are three lens elements with refractive power, the distance on the optical axis between the first and the second lens elements is T12, the distance on the optical axis between the second and the third lens elements is T23, the focal length of the photographing optical lens assembly is f, the focal length of the first lens element is f1, the focal length of the second lens element is f2, the focal length of the third lens element is f3, the radius of curvature on the object-side surface of the second lens element is R3, the radius of curvature on the image-side surface of the second lens element is R4, the distance on the optical axis between the object-side surface of the first lens element and the image-side surface of the third lens element is Td, the distance on the optical axis between the object-side surface of the first lens element and the electronic sensor is TTL, and they satisfy the relations: $0.40 < T12/T23 < 2.70$; $1.10 < |f/f1| + |f/f2| + |f/f3| < 3.30$; $-2.50 < R3/R4 < -0.12$; $0.40 < Td/TTL < 0.78$.

According to another aspect of the present invention, a photographing optical lens assembly comprises, in order from the object side to the image side: a first lens element with positive refractive power having a convex object-side surface; a second lens element having a concave image-side surface, the object-side and image-side surfaces thereof being aspheric, at least one inflection point formed on the image-side surface, made of plastic materials; and a third lens element having a concave image-side surface, the object-side and image-side surfaces thereof being aspheric, at least one inflection point formed on the image-side surface, made of plastic materials; wherein there are three lens elements with refractive power, the distance on the optical axis between the first and the second lens elements is T12, the distance on the optical axis between the second and the third lens elements is T23, the thickness on the optical axis of the second lens element is CT2, the thickness on the optical axis of the third lens element is CT3, the refractive index of the first lens element is N1, the refractive index of the second lens element is N2, the distance between the inflection point on the image-side surface of the second lens element and the optical axis is y", the distance between the effective radius position on the image-side surface of the second lens element and the optical axis is Y, and they satisfy the relations: $0.40 < T12/T23 < 2.35$; $0.50 < CT3/CT2 < 1.65$; $|N1-N2| < 0.15$; $0.03 < y''/Y < 0.50$.

The aforementioned arrangement of optical elements can effectively reduce the total track length of the lens assembly, attenuate the sensitivity of the optical system, and obtain higher resolution.

In the present photographing optical lens assembly, the first lens element with positive refractive power provides the refractive power of the system, which reduces the total track length of the photographing optical lens assembly; the second lens element has negative refractive power so as to favorably correct the aberration generated from the first lens element and the chromatic aberration of the system; the third lens element can have positive or negative refractive power; when the third lens element has positive refractive power, the refractive power of the first lens element can be effectively distributed to reduce the sensitivity of the system; when the third lens element has negative refractive power, the principal point of the optical system can be further away from the image plane to reduce the total track length of the system in order to stay compact.

In the present photographing optical lens assembly, the first lens element may be a bi-convex lens element or a meniscus lens element having a convex object-side surface and a concave image-side surface. When the first lens element is a bi-convex lens element, the refractive power thereof can be effectively enhanced, thus shortening the total track length of the photographing optical lens assembly. When the first lens element is a meniscus lens element, the astigmatism of the system can be corrected more favorably. The second lens element may have a concave image-side surface so that the Petzval Sum of the system can be corrected more favorably, with a more even image around the image plane; furthermore, preferably, the second lens element is a bi-concave lens element with both the object-side and the image-side surfaces being concave. The third lens element has a concave image-side surface, making the principal point of the optical system further away from the image plane, in order to effectively reduce the total track length of the system and keep the system compact. Moreover, preferably, the third lens element has a convex object-side surface and a concave image-side surface in order to correct both the astigmatism and the high order aberration of the system.

In the present photographing optical lens assembly, the stop can be disposed between an imaged object and the first lens element or between the first and the second lens elements. The first lens element provides positive refractive power, and the stop is disposed near the object side of the photographing optical lens assembly, thereby the total track length of the photographing optical lens assembly can be reduced effectively. The aforementioned arrangement also enables the exit pupil of the photographing optical lens assembly to be positioned far away from the image plane, thus light will be projected onto the electronic sensor at a nearly perpendicular angle, and this is the telecentric feature of the image side. The telecentric feature is very important to the photosensitive power of the solid-state sensor as it can improve the photosensitivity of the sensor to reduce the probability of shading occurrence. Moreover, the second or the third lens element is provided with at least one inflection point, thereby the angle of incidence from the off-axis field can be effectively reduced to further correct the off-axis aberrations. In addition, when the stop is positioned closer to the second lens element, the feature of the wide angle of view is emphasized which corrects the distortion and chromatic aberration of magnification, and such arrangement effectively reduces the sensitivity of the system. Thus, in the present photographing optical lens assembly, the stop is positioned between the imaged object and the second lens element, in order to obtain a good balance between the telecentric feature and the wide angle of view in the photographing optical lens assembly. When the stop is disposed between the imaged object and the first lens element, the telecentric feature is emphasized and this enables a shorter total track length.

BRIEF DESCRIPTION OF THE DRAWINGS

FIG. 6 is TABLE 1 which lists the optical data of the first embodiment.

FIGS. 7A and 7B are TABLE 2A and TABLE 2B which list the aspheric surface data of the first embodiment.

FIG. 8 is TABLE 3 which lists the optical data of the second embodiment.

FIGS. 9A and 9B are TABLES 4A and 4B which list the aspheric surface data of the second embodiment.

FIG. 10 is TABLE 5 which lists the optical data of the third embodiment.

FIGS. 11A and 11B are TABLES 6A and 6B which list the aspheric surface data of the third embodiment.

FIG. 12 is TABLE 7 which lists the optical data of the fourth embodiment.

FIG. 13 is TABLE 8 which lists the aspheric surface data of the fourth embodiment.

FIG. 14 is TABLE 9 which lists the optical data of the fifth embodiment.

FIG. 15 is TABLES 10 which lists the aspheric surface data of the fifth embodiment.

FIG. 16 is TABLE 11 which lists the data of the respective embodiments resulting from the equations.

DETAILED DESCRIPTION OF THE PREFERRED EMBODIMENTS

Figure 1A:
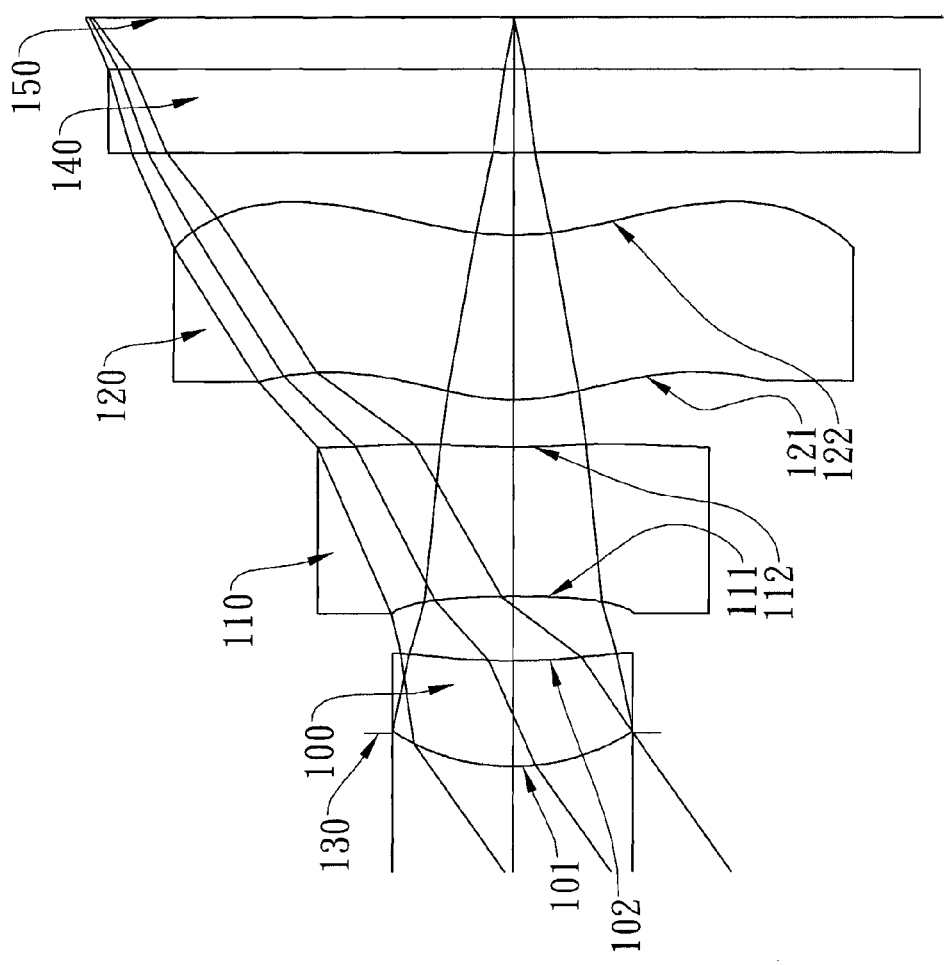
FIG. 1A shows a photographing optical lens assembly in accordance with a first embodiment of the present invention.

The present invention provides a photographing optical lens assembly comprising, in order from an object side to an image side: a first lens element with positive refractive power having a convex object-side surface; a second lens element with negative refractive power having a concave object-side surface and a concave image-side surface, the object-side and image-side surfaces thereof being aspheric; and a third lens element having a concave image-side surface, the object-side and image-side surfaces thereof being aspheric, at least one inflection point formed on the image-side surface; wherein there are three lens elements with refractive power; and wherein the distance on the optical axis between the first and the second lens elements is T12, the distance on the optical axis between the second and the third lens elements is T23, the thickness on the optical axis of the second lens element is CT2, the thickness on the optical axis of the third lens element is CT3, the radius of curvature on the object-side surface of the first lens element is R1, the radius of curvature on the image-side surface of the first lens element is R2, the radius of curvature on the object-side surface of the second lens element is R3, the radius of curvature on the image-side surface of the second lens element is R4, and they satisfy the relations: $0.40<T12/T23<2.35$; $0.50<CT3/CT2<1.65$; $-2.00<R1/R2<0.50$; $-3.20<R3/R4<0.00$.

When the aforementioned photographing optical lens assembly satisfies the relation of $0.40<T12/T23<2.35$, the spacing between lens elements of the lens assembly will be appropriate, favorable for lens assembly process, and more efficient use of space, in order to keep the lens assembly compact. When the aforementioned photographing optical lens assembly satisfies the relation: $0.50<CT3/CT2<1.65$, the thickness of the second and the third lens elements are more desirable within a limited space in the lens assembly, which obtains a good balance between the shortening of the total track length and the correction of the aberration. Also, appropriate lens thickness contributes to the ease of lens manufacturing and injection molding processes, and a photographing optical lens assembly with consistent good image quality can be achieved. When the aforementioned photographing optical lens assembly satisfies the relation: $-2.00<R1/R2<0.50$, the spherical aberration of the system can be favorably corrected; preferably, also satisfies the relation: $-0.65<R1/R2<0.45$. When the aforementioned photographing optical lens assembly satisfies the relation: $-3.20<R3/R4<0.00$, the Petzval Sum of the system can be corrected more favorably, with a more even image around the image plane and improved image quality of the system. Preferably, it satisfies the relation: $-2.50<R3/R4<-0.12$.

In the aforementioned photographing optical lens assembly of the present invention, preferably, the third lens element has a convex object-side surface which can correct the astigmatism of the system and high order aberration. Preferably, the second and the third lens elements are made of plastic materials, which can effectively reduce the weight of the lens assembly and lower the production costs.

In the aforementioned photographing optical lens assembly of the present invention, the second lens element has at least one inflection point on its image-side surface. The distance between the inflection point on the image-side surface of the second lens element and the optical axis is y", and the distance between the effective radius position on the image-side surface of the second lens element and the optical axis is Y, and preferably, they satisfy the relation: $0.03<y''/Y<0.50$. When y"/Y satisfies the aforementioned relation, aberration of on-axis and off-axis fields of the system can be effectively corrected.

In the aforementioned photographing optical lens assembly of the present invention, preferably, the photographing optical lens assembly further provides a stop and an electronic sensor for image formation. The stop is disposed between the imaged object and the second lens element, and the electronic sensor is disposed at the image plane; wherein the distance on the optical axis between the stop and the electronic sensor is SL, the distance on the optical axis between the object-side surface of the first lens element and the electronic sensor is TTL, and preferably, they satisfy the relation: $0.70<SL/TTL<1.20$. When SL/TTL satisfies the aforementioned relation, the photographing optical lens assembly can favorably obtain good balance between the telecentric feature and the wide angle of view; furthermore, preferably, the stop is disposed between the imaged object and the first lens element satisfies the relation: $0.87<SL/TTL<1.10$. When SL/TTL satisfies the aforementioned relation, the telecentric feature is emphasized, and the total track length of the optical lens assembly can be reduced.

In the aforementioned photographing optical lens assembly of the present invention, the Abbe number of the first lens element is V1, the Abbe number of the second lens element is V2, and preferably, they satisfy the relation: $31.0<V1-V2<42.0$. When V1-V2 satisfies the aforementioned relation, chromatic aberration of the photographing optical lens assembly can be favorably corrected.

In the aforementioned photographing optical lens assembly of the present invention, the radius of curvature on the object-side of the third lens element is R5, the radius of curvature on the image-side of the third lens element is R6, and preferably, they satisfy the relation: $0.50<R5/R6<1.00$. When R5/R6 satisfies the aforementioned relation, astigmatism and high order aberration of the system can be favorably corrected.

In the aforementioned photographing optical lens assembly of the present invention, the focal length of the photographing optical lens assembly is f, the focal length of the first lens element is f1, the focal length of the second lens element is f2, the focal length of the third lens element is f3, and preferably, they satisfy the relation: $1.10<|f/f1|+|f/f2|+|f/f3|<3.30$. When f1, f2, f3 satisfy the aforementioned relation, the refractive power of the lens assembly can be effectively controlled from becoming too large in order to reduce the sensitivity of the system; preferably, they satisfy the relation: $2.20<|f/f1|+|f/f2|+|f/f3|<3.00$.

In the aforementioned photographing optical lens assembly of the present invention, the distance on the optical axis between the object-side surface of the first lens element and the image-side surface of the third lens element is Td, the distance on the optical axis between the object-side surface of the first lens element and the electronic sensor is TTL, and preferably, they satisfy the relation: $0.40<Td/TTL<0.78$. When Td/TTL satisfies the aforementioned relation, the lens elements are placed more tightly together in order to achieve the compact property of the lens assembly.

In the aforementioned photographing optical lens assembly of the present invention, the distance on the optical axis between the object-side surface of the first lens element and the electronic sensor is TTL, half of the diagonal length of the effective pixel area of the electronic sensor is ImgH, and preferably, they satisfy the relation: $TTL/ImgH<1.85$. When TTL/ImgH satisfies the aforementioned relation, the photographing optical lens assembly can be favorable maintained in compact size and applicable for light weight, mobile electronic products.

According to another aspect of the present invention, a photographing optical lens assembly comprises, in order from an object side to an image side: a first lens element with positive refractive power having a convex object-side surface; a second lens element with negative refractive power having a concave object-side surface and a concave image-side surface, the object-side and image-side surfaces thereof being aspheric; and a third lens element having a concave image-side surface, the object-side and image-side surfaces thereof being aspheric, at least one inflection point formed on the image-side surface; wherein the photographing optical lens assembly further provides an electronic sensor for image formation at the image plane; wherein there are three lens elements with refractive power; and wherein the distance on the optical axis between the first and second lens elements is T12, the distance on the optical axis between the second and third lens elements is T23, the focal length of the photographing optical lens assembly is f, the focal length of the first lens element is f1, the focal length of the second lens element is f2, the focal length of the third lens element is f3, the radius of curvature on the object-side surface of the second lens element is R3, the radius of curvature on the image-side surface of the second lens element is R4, the distance on the optical axis between the object-side surface of the first lens element and the image-side surface of the third lens element is Td, the distance on the optical axis between the object-side surface of the first lens element and the electronic sensor is TTL, and they satisfy the relations: 0.40<T12/T23<2.70; 1.10<|f/f1|+|f/f2|+|f/f3|<3.30; −2.50<R3/R4<−0.12; 0.40<Td/TTL<0.78.

When the aforementioned photographing optical lens assembly satisfies the relation of 0.40<T12/T23<2.70, the spacing between lens elements of the lens assembly will be appropriate, favorable for lens assembly process, and more efficient use of space, in order to keep the lens assembly compact, preferably, satisfies the relation: 0.40<T12/T23<2.35. When the aforementioned photographing optical lens assembly satisfies the relation: 1.10<|f/f1|+|f/f2|+|f/f3|<3.30, the refractive power of the lens assembly can be effectively controlled from becoming too large in order to reduce the sensitivity of the system; preferably, they satisfy the relation: 2.20<|f/f1|+|f/f2|+|f/f3|<3.00. When the aforementioned photographing optical lens assembly satisfies the relation: −2.50<R3/R4<−0.12, the Petzval Sum of the system can be corrected more favorably, with a more even image around the image plane and improved image quality of the system. When the aforementioned photographing optical lens assembly satisfies the relation: 0.40<Td/TTL<0.78, the lens elements are placed more tightly together in order to achieve the compact property of the lens assembly.

In the aforementioned photographing optical lens assembly of the present invention, preferably, the third lens element has a convex object-side surface which can correct the astigmatism of the system and high order aberration. Preferably, the second and third lens elements are made of plastic materials, which can effectively reduce the weight of the lens assembly and lower the production costs.

In the aforementioned photographing optical lens assembly of the present invention, the Abbe number of the first lens element is V1, the Abbe number of the second lens element is V2, and preferably, they satisfy the relation: 31.0<V1−V2<42.0. When V1−V2 satisfies the aforementioned relation, chromatic aberration of the photographing optical lens assembly can be favorably corrected.

In the aforementioned photographing optical lens assembly of the present invention, preferably, the photographing optical lens assembly further provides a stop, disposed between the imaged object and the first lens element; wherein the distance on the optical axis between the stop and the electronic sensor is SL, the distance on the optical axis between the object-side surface of the first lens element and the electronic sensor is TTL, and preferably, they satisfy the relation: 0.87<SL/TTL<1.10. When SL/TTL satisfies the aforementioned relation, the telecentric feature is emphasized and this enables a shorter total track length.

In the aforementioned photographing optical lens assembly of the present invention, the radius of curvature on the object-side surface of the first lens element is R1, the radius of curvature on the image-side surface of the first lens element is R2, and preferably, they satisfy the relation: −2.00<R1/R2<0.50. When R1/R2 satisfies the aforementioned relation, the spherical aberration of the system can be favorably corrected.

According to another aspect of the present invention, a photographing optical lens assembly comprises, in order from an object side to an image side: a first lens element with positive refractive power having a convex object-side surface; a second lens element having a concave image-side surface, the object-side and image-side surfaces thereof being aspheric, at least one inflection point formed on the image-side surface, made of plastic materials; and a third lens element having a concave image-side surface, the object-side and image-side surfaces thereof being aspheric, at least one inflection point formed on the image-side surface, made of plastic materials; wherein there are three lens elements with refractive power, the distance on the optical axis between the first and second lens elements is T12, the distance on the optical axis between the second and third lens elements is T23, the thickness on the optical axis of the second lens element is CT2, the thickness on the optical axis of the third lens element is CT3, the refractive power of the first lens element is N1, the refractive power of the second lens element is N2, the distance between the inflection point on the image-side surface of the second lens element and the optical axis is y", the distance between the effective radius position on the image-side surface of the second lens element and the optical axis is Y, and they satisfy the relations: 0.40<T12/T23<2.35; 0.50<CT3/CT2<1.65; |N1−N2|<0.15; 0.03<y"/Y<0.50.

When the aforementioned photographing optical lens assembly satisfies the relation: 0.40<T12/T23<2.35, the spacing between lens elements of the lens assembly will be appropriate, favorable for lens assembly process, and more efficient use of space, in order to keep the lens assembly compact. When the aforementioned photographing optical lens assembly satisfies the relation: 0.50<CT3/CT2<1.65, the thickness of the second and third lens elements are more desirable within a limited space in the lens assembly, which obtains a good balance between the shortening of the total track length and the correction of the aberration. Also, appropriate lens thickness contributes to the ease of lens manufacturing and injection molding processes, and a photographing optical lens assembly with consistent good image quality. When the aforementioned photographing optical lens assembly satisfies the relation: |N1−N2|<0.15, the ability to correct the aberration of the photographing optical lens assembly can be effectively improved. When the aforementioned photographing optical lens assembly satisfies the relation: 0.03<y"/Y<0.50, aberration of on-axis and off-axis fields of the system can be effectively corrected.

In the aforementioned photographing optical lens assembly of the present invention, preferably, the second lens element has a concave object-side surface so that the Petzval Sum of the system can be corrected more favorably, with a more even image around the image plane; preferably, the third lens element has a convex object-side surface which is favorable for correcting astigmatism of the system and high order aberration.

In the aforementioned photographing optical lens assembly of the present invention, preferably, the photographing optical lens assembly further provides a stop and an electronic sensor for image formation, wherein the stop is disposed between the imaged object and the second lens element, and the electronic sensor is disposed at the image plane; wherein the distance on the optical axis between the stop and the electronic sensor is SL, the distance on the optical axis between the object-side surface of the first lens element and the electronic sensor is TTL, and preferably, they satisfy the relation: 0.70<SL/TTL<1.20. When SL/TTL satisfies the aforementioned relation, a good balance between the telecentric feature and the wide angle of view of the photographing optical lens assembly can be obtained.

In the aforementioned photographing optical lens assembly of the present invention, the Abbe number of the first lens element is V1, the Abbe number of the second lens element is V2, and preferably, they satisfy the relation: 31.0<V1−V2< 42.0. When V1−V2 satisfies the aforementioned relation, chromatic aberration of the photographing optical lens assembly can be favorably corrected.

In the aforementioned photographing optical lens assembly of the present invention, the radius of curvature on the object-side surface of the first lens element is R2, the radius of curvature on the image-side surface of the first lens element is R2, and preferably, they satisfy the relation: −0.65<R1/R2< 0.45. When R1/R2 satisfies the aforementioned relation, the spherical aberration of the system can be favorably corrected.

In the present photographing optical lens assembly, the lens elements can be made of glass or plastic materials. If the lens elements are made of glass, there is more freedom in distributing the refractive power of the system. If plastic materials are adopted to produce the lens elements, the production cost will be reduced effectively. Additionally, the surfaces of the lens elements can be aspheric and easily made into non-spherical profiles, allowing more design parameter freedom which can be used to reduce aberrations and the total number of the lens elements, so that the total track length of the photographing optical lens assembly can be effectively reduced.

In the present photographing optical lens assembly, if a lens element has a convex surface, it means the portion of the surface in proximity of the axis is convex; if a lens element has a concave surface, it means the portion of the surface in proximity of the axis is concave.

Figure 17:
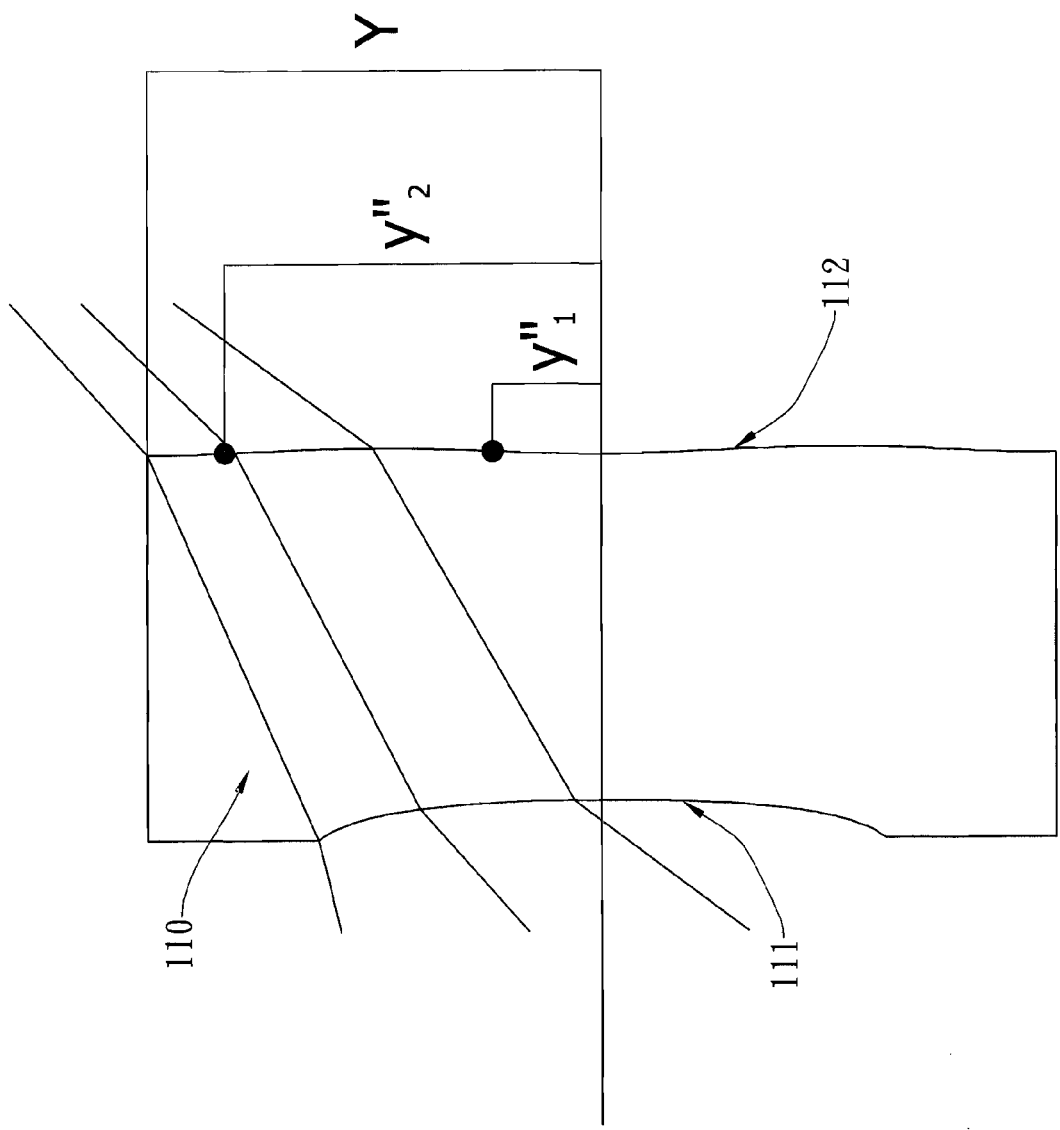
FIG. 17 shows a magnified view of the second lens element in accordance with a first embodiment of the present invention, to further display the distance represented by y''' and Y, and their corresponding locations.

In the present photographing optical lens assembly, the effective radius on the image-side surface of the second lens element is defined as: the boundary of the maximum area on the image-side surface of the second lens element where the light travels through. Please refer to FIG. 17, which shows the relative positions of y" and Y. FIG. 17 is the enlarged view of the second lens element 110 in the first embodiment (which will be explained in the paragraphs below) of the present invention. There are two inflection points on the image-side surface 112 of the second lens element 110 (due to the lens element is symmetrical to the optical axis, there are infinite number of inflection points with a same distance from the inflection shown and the optical axis; however, all the inflection points with the same distance away from the optical axis on the surface are represented by the one shown in the figure); wherein the distance between the first inflection point on the image-side surface 112 of the second lens element 110 and the optical axis is y"1, the distance between the second inflection point on the image-side surface 112 of the second lens element 110 and the optical axis is y"2, the distance between the effective radius position on the image-side surface of the second lens element and the optical axis is Y.

Preferred embodiments of the present invention will be described in the following paragraphs by referring to the accompanying drawings.

Figure 1B:
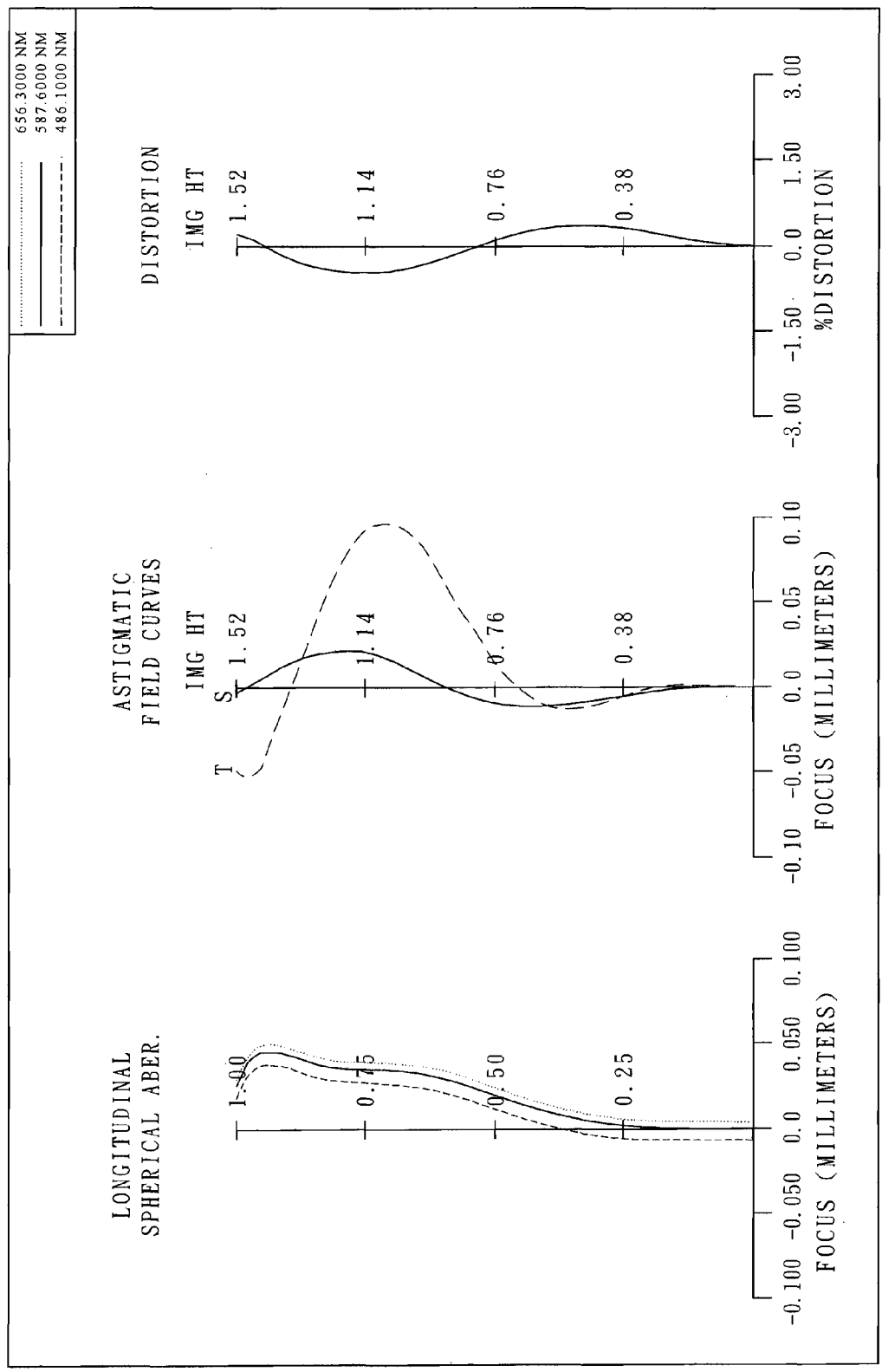
FIG. 1B shows the aberration curves of the first embodiment of the present invention.

FIG. 1A shows a photographing optical lens assembly in accordance with a first embodiment of the present invention, and FIG. 1B shows the aberration curves of the first embodiment of the present invention. The photographing optical lens assembly of the first embodiment of the present invention mainly comprises three lens elements, in order from an object side to an image side: a plastic first lens element 100 with positive refractive power having a convex object-side surface 101 and a concave image-side surface 102, the object-side and image-side surfaces 101 and 102 thereof being aspheric; a plastic second lens element 110 with negative refractive power having a concave object-side surface 111 and a concave image-side surface 112, the object-side and image-side surfaces 111 and 112 thereof being aspheric, two inflection points formed on the image-side surface 112; a plastic third lens element 120 with positive refractive power having a convex object-side surface 121 and a concave image-side surface 122, the object-side and image-side surfaces 121 and 122 thereof being aspheric, at least one inflection point formed on the image-side surface; wherein a stop 130 is disposed between an imaged object and the first lens element 100; wherein the photographing optical lens assembly further provides an IR filter 140 disposed between the image-side surface 122 of the third lens element 120 and an image plane 150; and wherein the IR filter 140 is made of glass and has no influence on the focal length of the photographing optical lens assembly.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present photographing optical lens assembly, the focal length of the photographing optical lens assembly is f, and it satisfies the relation: f=2.18 (mm).

In the first embodiment of the present photographing optical lens assembly, the f-number of the photographing optical lens assembly is Fno, and it satisfies the relation: Fno=2.48.

In the first embodiment of the present photographing optical lens assembly, half of the maximal field of view of the photographing optical lens assembly is HFOV, and it satisfies the relation: HFOV=35.1 deg.

In the first embodiment of the present photographing optical lens assembly, the Abbe number of the first lens element 100 is V1, the Abbe number of the second lens element 110 is V2, and they satisfy the relation: V1−V2=32.5.

In the first embodiment of the present photographing optical lens assembly, the refractive index of the first lens element 100 is N1, the refractive index of the second lens element 110 is N2, and it satisfies the relation: |N1−N2|=0.088.

In the first embodiment of the present photographing optical lens assembly, the distance on the optical axis between the first lens element 100 and the second lens element 110 is T12, the distance on the optical axis between the second lens element 110 and the third lens element 120 is T23, and they satisfy the relation: T12/T23=1.35.

In the first embodiment of the present photographing optical lens assembly, the thickness on the optical axis of the third lens element 120 is CT3, the thickness on the optical axis of the second lens element 110 is CT2, and it satisfies the relation: CT3/CT2=1.11.

In the first embodiment of the present photographing optical lens assembly, the radius of curvature of the object-side surface 101 of the first lens element 100 is R2, the radius of curvature of the image-side surface 102 of the first lens element 100 is R2, and they satisfy the relation: R1/R2=0.33.

In the first embodiment of the present photographing optical lens assembly, the radius of curvature of the object-side surface 111 of the second lens element 110 is R3, the radius of curvature of the image-side surface 112 of the second lens element 110 is R4, and they satisfy the relation: R3/R4=−1.82.

In the first embodiment of the present photographing optical lens assembly, the radius of curvature of the object-side surface 121 of the third lens element 120 is R5, the radius of curvature of the image-side surface 122 of the third lens element 120 is R6, and they satisfy the relation: R5/R6=0.72.

In the first embodiment of the present photographing optical lens assembly, the focal length of the photographing optical lens assembly is f, the focal length of the first lens element 100 is f1, the focal length of the second lens element 110 is f2, the focal length of the third lens element 120 is f3, and they satisfy the relation: |f/f1|+|f/f2|+|f/f3|=2.85.

In the first embodiment of the present photographing optical lens assembly, the distance between the first inflection point on the image-side surface 112 of the second lens element 110 and the optical axis is y"1, the distance between the second inflection point on the image-side surface 112 of the second lens element 110 and the optical axis is y"2, the distance between the effective radius of the image-side surface 112 of the second lens element 110 and the optical axis is Y, and they satisfy the relation: y"1/Y=0.24; y"2/Y=0.83

In the first embodiment of the present photographing optical lens assembly, the distance on the optical axis between the object-side surface 101 of the first lens element 100 and the image-side surface 122 of the third lens element 120 is Td, the distance on the optical axis between the object-side surface 101 of the first lens element 100 and the electronic sensor is TTL, and they satisfy the relation: Td/TTL=0.74.

In the first embodiment of the present photographing optical lens assembly, the distance on the optical axis between the stop 130 and the electronic sensor is SL, the distance on the optical axis between the object-side surface 101 of the first lens element 100 and the electronic sensor is TTL, and they satisfy the relation: SL/TTL=0.95.

In the first embodiment of the present photographing optical lens assembly, the distance on the optical axis between the object-side surface 101 of the first lens element 100 and the electronic sensor is TTL, half of the diagonal length of the effective pixel area of the electronic sensor is ImgH, and they satisfy the relation: TTL/ImgH=1.71.

The detailed optical data of the first embodiment is shown in FIG. 6 (TABLE 1), and the aspheric surface data is shown in FIGS. 7A and 7B (TABLES 2A and 2B), wherein the units of the radius of curvature, the thickness and the focal length are expressed in mm, and HFOV is half of the maximal field of view.

Figure 2A:
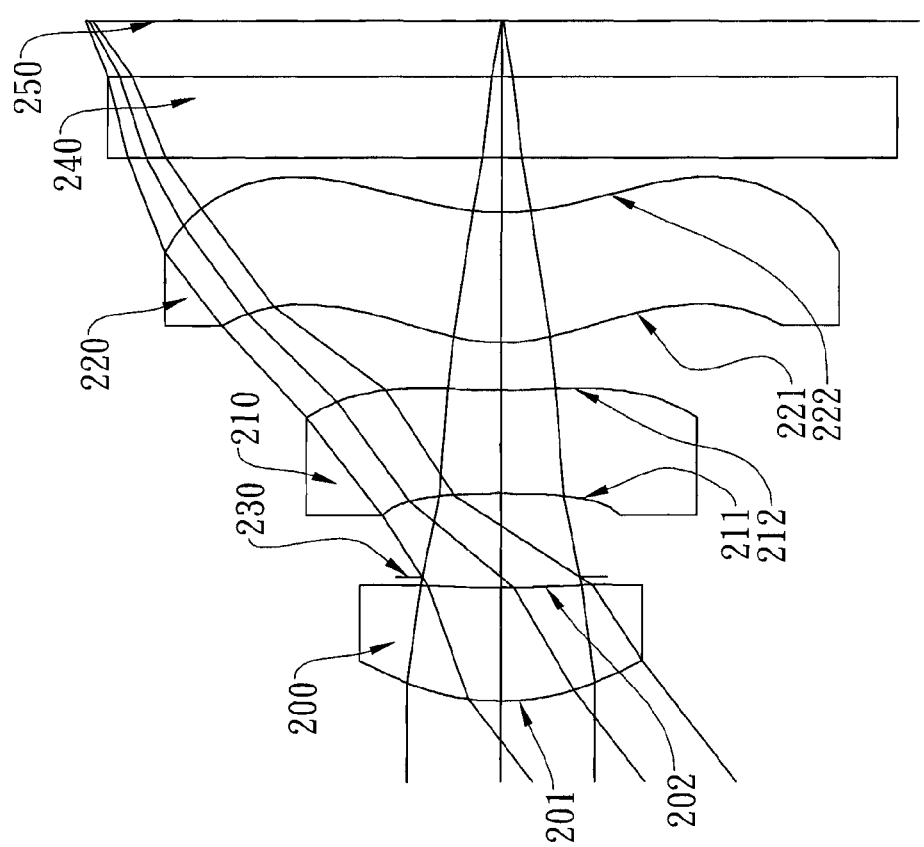
FIG. 2A shows a photographing optical lens assembly in accordance with a second embodiment of the present invention.
Figure 2B:
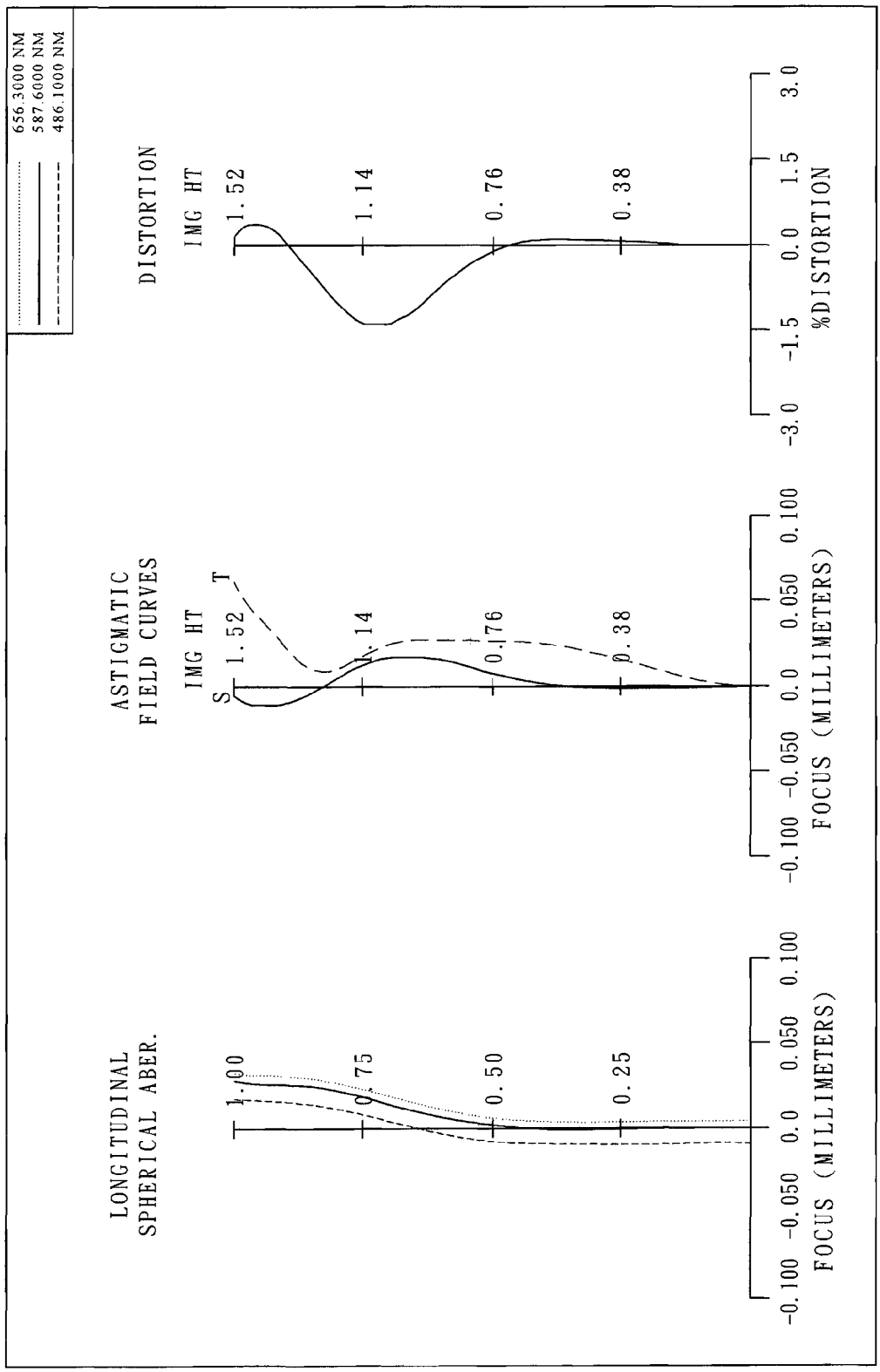
FIG. 2B shows the aberration curves of the second embodiment of the present invention.

FIG. 2A shows a photographing optical lens assembly in accordance with a second embodiment of the present invention, and FIG. 2B shows the aberration curves of the second embodiment of the present invention. The photographing optical lens assembly of the second embodiment of the present invention mainly comprises three lens elements, in order from the object side to the image side: a plastic first lens element 200 with positive refractive power having a convex object-side surface 201 and a concave image-side surface 202, the object-side and image-side surfaces 201 and 202 thereof being aspheric; a plastic second lens element 210 with negative refractive power having a concave object-side surface 211 and a concave image-side surface 212, the object-side and image-side surfaces 211 and 212 thereof being aspheric, one inflection point formed on the image-side surface 212; a plastic third lens element 220 with positive refractive power having a convex object-side surface 221 and a concave image-side surface 222, the object-side and image-side surfaces 221 and 222 thereof being aspheric, at least one inflection point formed on the image-side surface 222; wherein a stop 230 is disposed between the first lens element 200 and the second lens element 210; wherein the photographing optical lens assembly further provides an IR filter 240 disposed between the image-side surface 222 of the third lens element 220 and an image plane 250; and wherein the IR filter 240 is made of glass and have no influence on the focal length of the photographing optical lens assembly.

The equation of the aspheric surface profiles of the second embodiment has the same form as that of the first embodiment.

In the second embodiment of the present photographing optical lens assembly, the focal length of the photographing optical lens assembly is f, and it satisfies the relation: f=1.99 (mm).

In the second embodiment of the present photographing optical lens assembly, the f-number of the photographing optical lens assembly is Fno, and it satisfies the relation: Fno=2.85.

In the second embodiment of the present photographing optical lens assembly, half of the maximal field of view of the photographing optical lens assembly is HFOV, and it satisfies the relation: HFOV=37.5 deg.

In the second embodiment of the present photographing optical lens assembly, the Abbe number of the first lens element 200 is V1, the Abbe number of the second lens element 210 is V2, and they satisfy the relation: V1−V2=32.5.

In the second embodiment of the present photographing optical lens assembly, the refractive index of the first lens element 200 is N1, the refractive index of the second lens element 210 is N2, and it satisfies the relation: |N1−N2|=0.088.

In the second embodiment of the present photographing optical lens assembly, the distance on the optical axis between the first lens element 200 and the second lens element 210 is T12, the distance on the optical axis between the second lens element 210 and the third lens element 220 is T23, and they satisfy the relation: T12/T23=1.97.

In the second embodiment of the present photographing optical lens assembly, the thickness on the optical axis of the third lens element 220 is CT3, the thickness on the optical axis of the second lens element 210 is CT2, and it satisfies the relation: CT3/CT2=1.27.

In the second embodiment of the present photographing optical lens assembly, the radius of curvature of the object-side surface 201 of the first lens element 200 is R2, the radius of curvature of the image-side surface 202 of the first lens element 200 is R2, and they satisfy the relation: R1/R2=0.22.

In the second embodiment of the present photographing optical lens assembly, the radius of curvature of the object-side surface 211 of the second lens element 210 is R3, the radius of curvature of the image-side surface 212 of the second lens element 210 is R4, and they satisfy the relation: R3/R4=−1.81.

In the second embodiment of the present photographing optical lens assembly, the radius of curvature of the object-side surface 221 of the third lens element 220 is R5, the radius of curvature of the image-side surface 222 of the third lens element 220 is R6, and they satisfy the relation: R5/R6=0.68.

In the second embodiment of the present photographing optical lens assembly, the focal length of the photographing optical lens assembly is f, the focal length of the first lens element 200 is f1, the focal length of the second lens element 210 is f2, the focal length of the third lens element 220 is f3, and they satisfy the relation: |f/f1|+|f/f2|+|f/f3|=2.75.

In the second embodiment of the present photographing optical lens assembly, the distance between the inflection point on the image-side surface 212 of the second lens element 210 and the optical axis is y", the distance between the effective radius of the image-side surface 212 of the second lens element 210 and the optical axis is Y, and they satisfy the relation: y"/Y=0.21

In the second embodiment of the present photographing optical lens assembly, the photographing optical lens assembly further provides an electronic sensor for image formation at the image plane 250; wherein the distance on the optical axis between the object-side surface 201 of the first lens element 200 and the image-side surface 222 of the third lens element 220 is Td, the distance on the optical axis between the object-side surface 201 of the first lens element 200 and the electronic sensor is TTL, and they satisfy the relation: Td/TTL=0.75.

In the second embodiment of the present photographing optical lens assembly, the distance on the optical axis between the stop 230 and the electronic sensor is SL, the distance on the optical axis between the object-side surface 201 of the first lens element 200 and the electronic sensor is TTL, and they satisfy the relation: SL/TTL=0.81.

In the second embodiment of the present photographing optical lens assembly, the distance on the optical axis between the object-side surface 201 of the first lens element 200 and the electronic sensor is TTL, half of the diagonal length of the effective pixel area of the electronic sensor is ImgH, and they satisfy the relation: TTL/ImgH=1.59.

The detailed optical data of the second embodiment is shown in FIG. 8 (TABLE 3), and the aspheric surface data is shown in FIGS. 9A and 9B (TABLES 4A and 4B), wherein the units of the radius of curvature, the thickness and the focal length are expressed in mm, and HFOV is half of the maximal field of view.

Figure 3A:
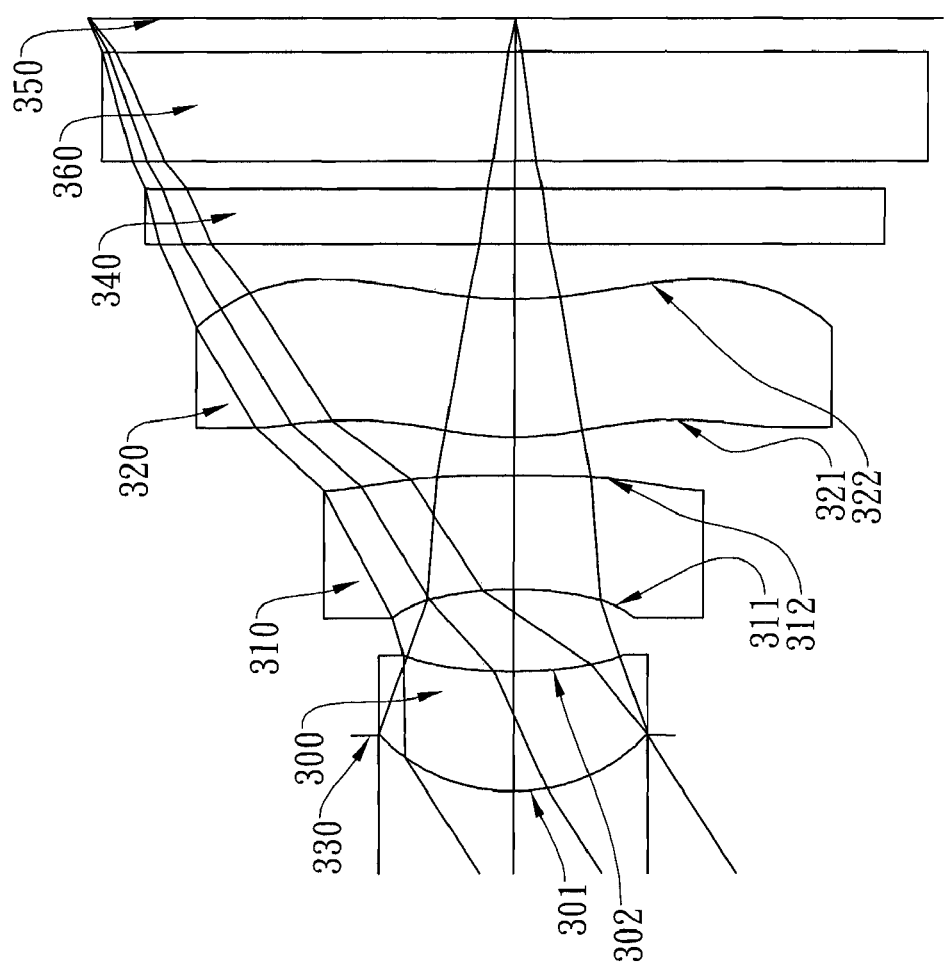
FIG. 3A shows a photographing optical lens assembly in accordance with a third embodiment of the present invention.
Figure 3B:
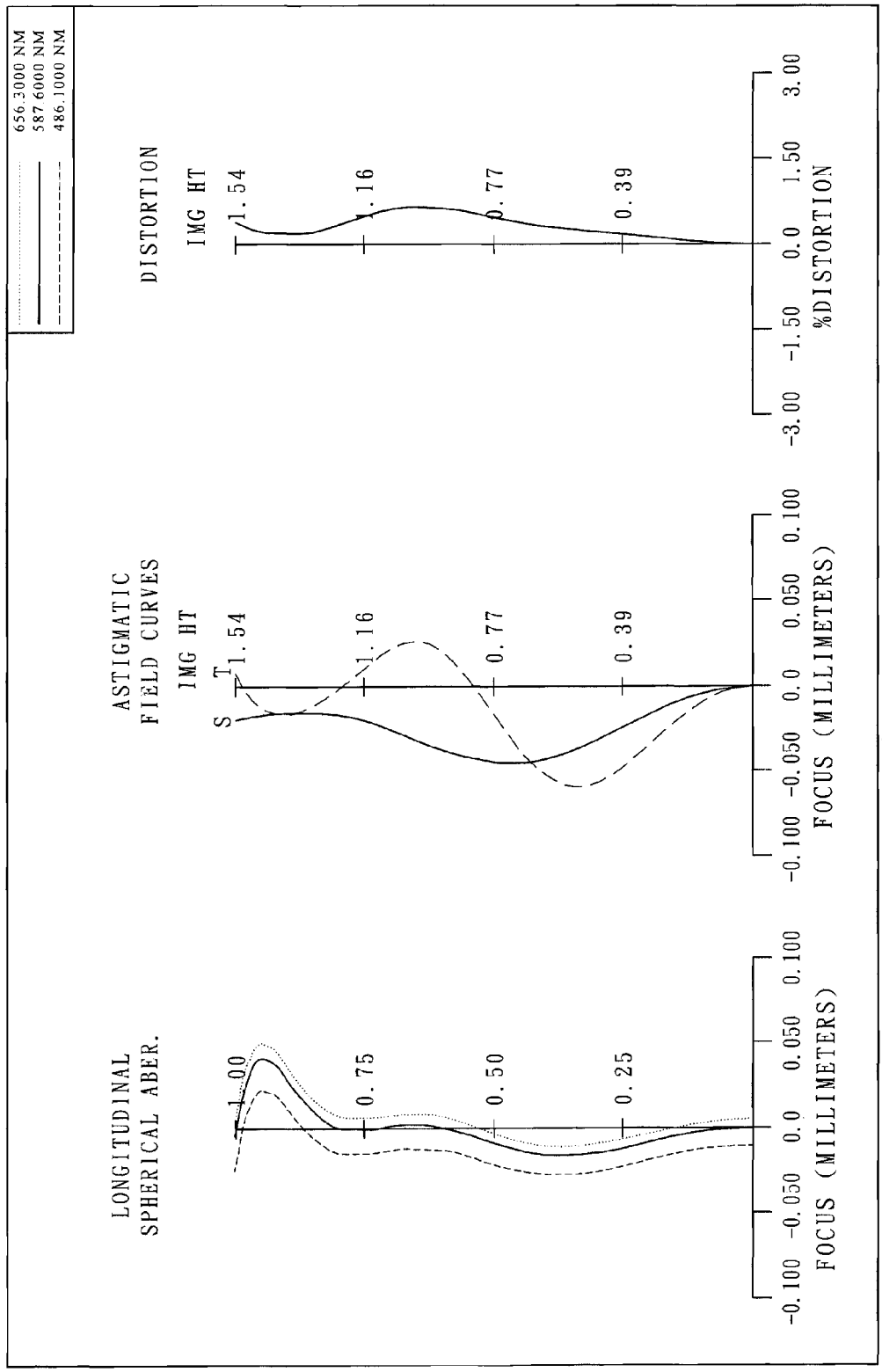
FIG. 3B shows the aberration curves of the third embodiment of the present invention.

FIG. 3A shows a photographing optical lens assembly in accordance with a third embodiment of the present invention, and FIG. 3B shows the aberration curves of the third embodiment of the present invention. The photographing optical lens assembly of the third embodiment of the present invention mainly comprises three lens elements, in order from the object side to the image side: a plastic first lens element 300 with positive refractive power having a convex object-side surface 301 and a concave image-side surface 302, the object-side and image-side surfaces 301 and 302 thereof being aspheric; a plastic second lens element 310 with negative refractive power having a concave object-side surface 311 and a concave image-side surface 312, the object-side and image-side surfaces 311 and 312 thereof being aspheric, two inflection points formed on the image-side surface 312; a plastic third lens element 320 with positive refractive power having a convex object-side surface 321 and a concave image-side surface 322, the object-side and image-side surfaces 321 and 322 thereof being aspheric, at least one inflection formed on the image-side surface 322; wherein a stop 330 is disposed between an imaged object and the first lens element 300; wherein the photographing optical lens assembly further provides an IR filter 340 disposed between the image-side surface 322 of the third lens element 320 and an image plane 350, and a cover glass 360 is disposed between the IR filter 340 and the image plane 350; and wherein the IR filter 340 and the cover glass 360 are made of glass and has no influence on the focal length of the photographing optical lens assembly.

The equation of the aspheric surface profiles of the third embodiment has the same form as that of the first embodiment.

In the third embodiment of the present photographing optical lens assembly, the focal length of the photographing optical lens assembly is f, and it satisfies the relation: f=2.41 (mm).

In the third embodiment of the present photographing optical lens assembly, the f-number of the photographing optical lens assembly is Fno, and it satisfies the relation: Fno=2.48.

In the third embodiment of the present photographing optical lens assembly, half of the maximal field of view of the photographing optical lens assembly is HFOV, and it satisfies the relation: HFOV=32.6 deg.

In the third embodiment of the present photographing optical lens assembly, the Abbe number of the first lens element 300 is V1, the Abbe number of the second lens element 310 is V2, and they satisfy the relation: V1−V2=32.5.

In the third embodiment of the present photographing optical lens assembly, the refractive index of the first lens element 300 is N1, the refractive index of the second lens element 310 is N2, and it satisfies the relation: |N1−N2|=0.088.

In the third embodiment of the present photographing optical lens assembly, the distance on the optical axis between the first lens element 300 and the second lens element 310 is T12, the distance on the optical axis between the second lens element 310 and the third lens element 320 is T23, and they satisfy the relation: T12/T23=2.11.

In the third embodiment of the present photographing optical lens assembly, the thickness on the optical axis of the third lens element 320 is CT3, the thickness on the optical axis of the second lens element 310 is CT2, and it satisfies the relation: CT3/CT2=1.21.

In the third embodiment of the present photographing optical lens assembly, the radius of curvature of the object-side surface 301 of the first lens element 300 is R2, the radius of curvature of the image-side surface 302 of the first lens element 300 is R2, and they satisfy the relation: R1/R2=0.40.

In the third embodiment of the present photographing optical lens assembly, the radius of curvature of the object-side surface 311 of the second lens element 310 is R3, the radius of curvature of the image-side surface 312 of the second lens element 310 is R4, and they satisfy the relation: R3/R4=−0.05.

In the third embodiment of the present photographing optical lens assembly, the radius of curvature of the object-side surface 321 of the third lens element 320 is R5, the radius of curvature of the image-side surface 322 of the third lens element 320 is R6, and they satisfy the relation: R5/R6=0.67.

In the third embodiment of the present photographing optical lens assembly, the focal length of the photographing optical lens assembly is f, the focal length of the first lens element 300 is f1, the focal length of the second lens element 310 is f2, the focal length of the third lens element 320 is f3, and they satisfy the relation: |f/f1|+|f/f2|+|f/f3|=3.05.

In the third embodiment of the present photographing optical lens assembly, the distance between the first inflection point on the image-side surface 312 of the second lens element 310 and the optical axis is y"1, the distance between the second inflection point on the image-side surface 312 of the second lens element 310 and the optical axis is y"2, the distance between the effective radius of the image-side surface 312 of the second lens element 310 and the optical axis is Y, and they satisfy the relation: y"1/Y=0.07; y"2/Y=0.75.

In the third embodiment of the present photographing optical lens assembly, the distance on the optical axis between the object-side surface 301 of the first lens element 300 and the image-side surface 322 of the third lens element 320 is Td, the distance on the optical axis between the object-side surface 301 of the first lens element 300 and the electronic sensor is TTL, and they satisfy the relation: Td/TTL=0.69.

In the third embodiment of the present photographing optical lens assembly, the distance on the optical axis between the stop 330 and the electronic sensor is SL, the distance on the optical axis between the object-side surface 301 of the first lens element 300 and the electronic sensor is TTL, and they satisfy the relation: SL/TTL=0.92.

In the third embodiment of the present photographing optical lens assembly, the distance on the optical axis between the object-side surface 301 of the first lens element 300 and the electronic sensor is TTL, half of the diagonal length of the effective pixel area of the electronic sensor is ImgH, and they satisfy the relation: TTL/ImgH=1.69.

The detailed optical data of the third embodiment is shown in FIG. 10 (TABLE 5), and the aspheric surface data is shown in FIGS. 11A and 11B (TABLES 6A and 6B), wherein the units of the radius of curvature, the thickness and the focal length are expressed in mm, and HFOV is half of the maximal field of view.

Figure 4A:
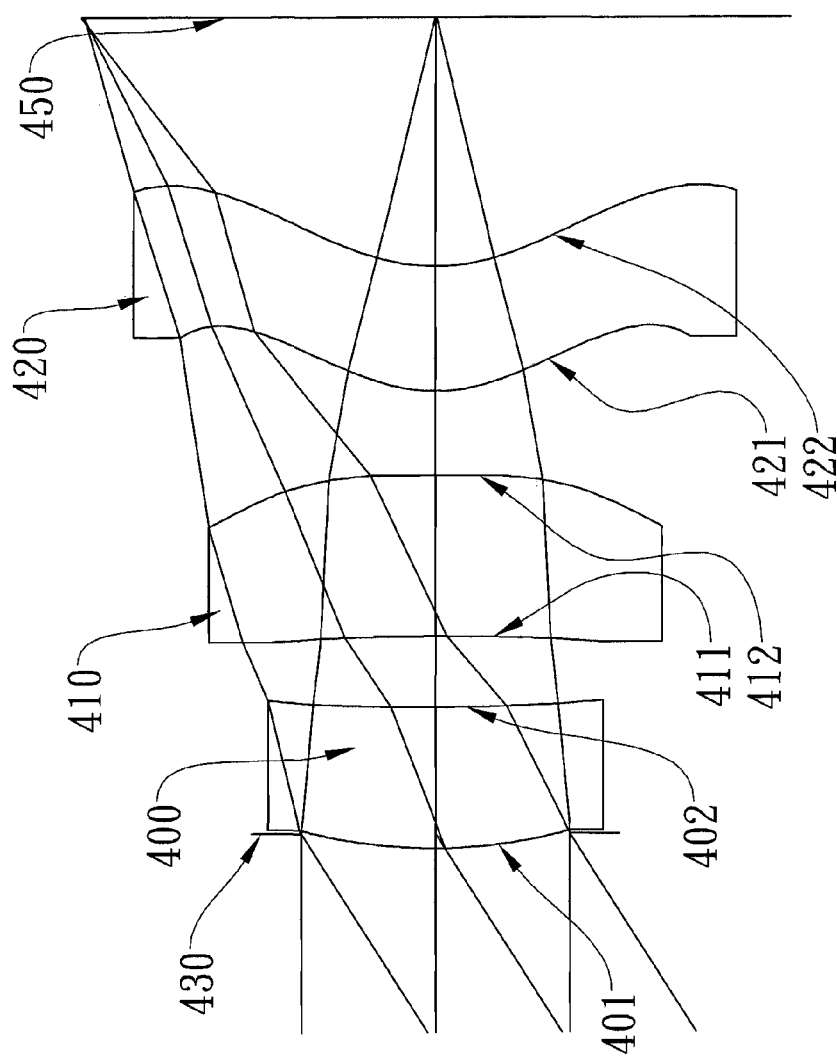
FIG. 4A shows a photographing optical lens assembly in accordance with a fourth embodiment of the present invention.
Figure 4B:
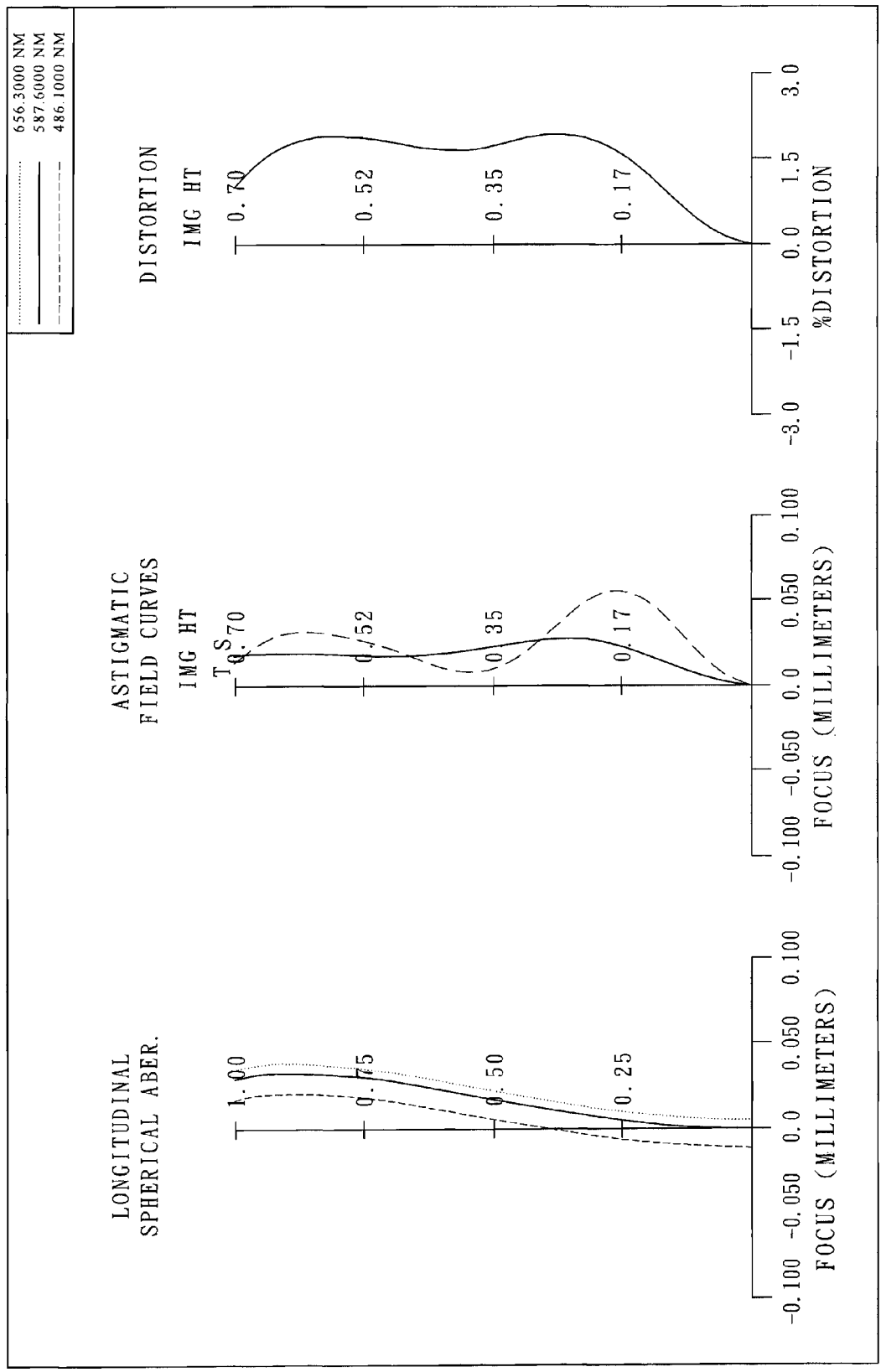
FIG. 4B shows the aberration curves of the fourth embodiment of the present invention.

FIG. 4A shows a photographing optical lens assembly in accordance with a fourth embodiment of the present invention, and FIG. 4B shows the aberration curves of the fourth embodiment of the present invention. The photographing optical lens assembly of the fourth embodiment of the present invention mainly comprises three lens elements, in order from the object side to the image side: a plastic first lens element 400 with positive refractive power having a convex object-side surface 401 and a concave image-side surface 402, the object-side and image-side surfaces 401 and 402 thereof being aspheric; a plastic second lens element 410 with negative refractive power having a concave object-side surface 411 and a concave image-side surface 412, the object-side and image-side surfaces 411 and 412 thereof being aspheric, one inflection point formed on the image-side surface 412; a plastic third lens element 420 with positive refractive power having a convex object-side surface 421 and a concave image-side surface 422, the object-side and image-side surfaces 421 and 422 thereof being aspheric, at least one inflection point formed on the image-side surface 422; wherein a stop 430 is disposed between an imaged object and the first lens element 400; wherein the photographing optical lens assembly further provides an image plane 450 for image formation.

The equation of the aspheric surface profiles of the fourth embodiment has the same form as that of the first embodiment.

In the fourth embodiment of the present photographing optical lens assembly, the focal length of the photographing optical lens assembly is f, and it satisfies the relation: f=1.11 (mm).

In the fourth embodiment of the present photographing optical lens assembly, the f-number of the photographing optical lens assembly is Fno, and it satisfies the relation: Fno=2.04.

In the fourth embodiment of the present photographing optical lens assembly, half of the maximal field of view of the photographing optical lens assembly is HFOV, and it satisfies the relation: HFOV=32.1 deg.

In the fourth embodiment of the present photographing optical lens assembly, the Abbe number of the first lens element 400 is V1, the Abbe number of the second lens element 410 is V2, and they satisfy the relation: V1−V2=0.0.

In the fourth embodiment of the present photographing optical lens assembly, the refractive index of the first lens element 400 is N1, the refractive index of the second lens element 410 is N2, and it satisfies the relation: |N1−N2|=0.000.

In the fourth embodiment of the present photographing optical lens assembly, the distance on the optical axis between the first lens element 400 and the second lens element 410 is T12, the distance on the optical axis between the second lens element 410 and the third lens element 420 is T23, and they satisfy the relation: T12/T23=0.83.

In the fourth embodiment of the present photographing optical lens assembly, the thickness on the optical axis of the third lens element 420 is CT3, the thickness on the optical axis of the second lens element 410 is CT2, and it satisfies the relation: CT3/CT2=0.77.

In the fourth embodiment of the present photographing optical lens assembly, the radius of curvature of the object-side surface 401 of the first lens element 400 is R1, the radius of curvature of the image-side surface 402 of the first lens element 400 is R2, and they satisfy the relation: R1/R2=0.21.

In the fourth embodiment of the present photographing optical lens assembly, the radius of curvature of the object-side surface 411 of the second lens element 410 is R3, the radius of curvature of the image-side surface 412 of the second lens element 410 is R4, and they satisfy the relation: R3/R4=−0.24.

In the fourth embodiment of the present photographing optical lens assembly, the radius of curvature of the object-side surface 421 of the third lens element 420 is R5, the radius of curvature of the image-side surface 422 of the third lens element 420 is R6, and they satisfy the relation: R5/R6=0.84.

In the fourth embodiment of the present photographing optical lens assembly, the focal length of the photographing optical lens assembly is f, the focal length of the first lens element 400 is f1, the focal length of the second lens element 410 is f2, the focal length of the third lens element 420 is f3, and they satisfy the relation: |f/f1|+|f/f2|+|f/f3|=1.30.

In the fourth embodiment of the present photographing optical lens assembly, the distance between the inflection point on the image-side surface 412 of the second lens element 410 and the optical axis is y", the distance between the effective radius of the image-side surface 412 of the second lens element 410 and the optical axis is Y, and they satisfy the relation: y"/Y=0.04.

In the fourth embodiment of the present photographing optical lens assembly, the distance on the optical axis between the object-side surface 401 of the first lens element 400 and the image-side surface 422 of the third lens element 420 is Td, the distance on the optical axis between the object-side surface 401 of the first lens element 400 and the electronic sensor is TTL, and they satisfy the relation: Td/TTL=0.70.

In the fourth embodiment of the present photographing optical lens assembly, the distance on the optical axis between the stop 430 and the electronic sensor is SL, the distance on the optical axis between the object-side surface 401 of the first lens element 400 and the electronic sensor is TTL, and they satisfy the relation: SL/TTL=0.98.

In the fourth embodiment of the present photographing optical lens assembly, the distance on the optical axis between the object-side surface 401 of the first lens element 400 and the electronic sensor is TTL, half of the diagonal length of the effective pixel area of the electronic sensor is ImgH, and they satisfy the relation: TTL/ImgH=2.38.

The detailed optical data of the fourth embodiment is shown in FIG. 12 (TABLE 7), and the aspheric surface data is shown in FIG. 13 (TABLE 8), wherein the units of the radius of curvature, the thickness and the focal length are expressed in mm, and HFOV is half of the maximal field of view.

Figure 5A:
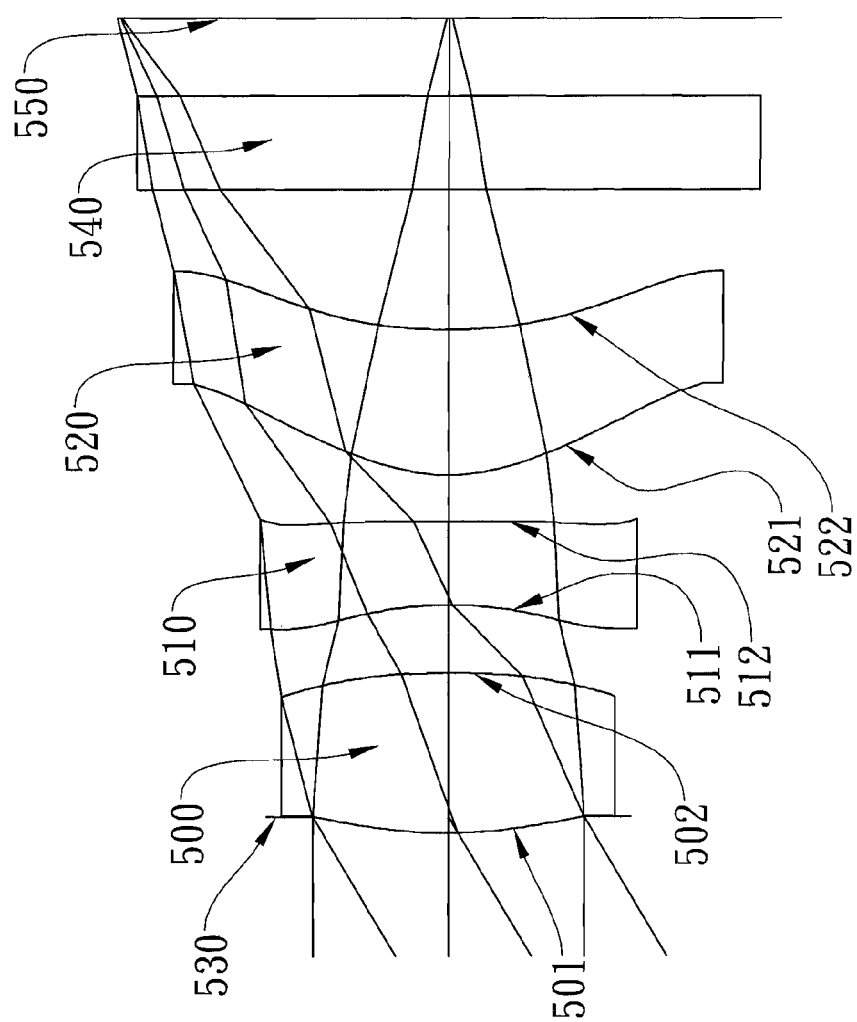
FIG. 5A shows a photographing optical lens assembly in accordance with a fifth embodiment of the present invention.
Figure 5B:
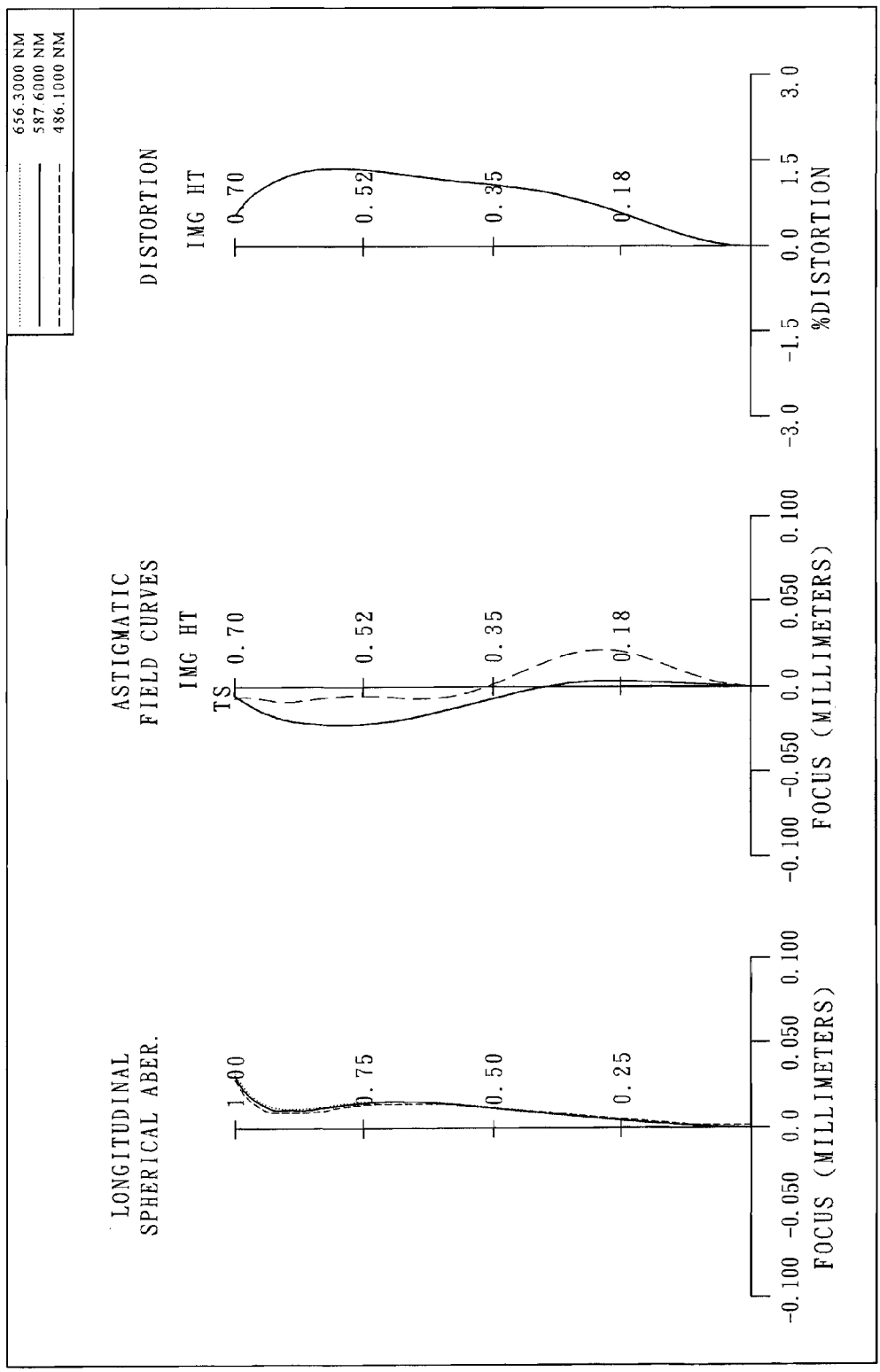
FIG. 5B shows the aberration curves of the fifth embodiment of the present invention.

FIG. 5A shows a photographing optical lens assembly in accordance with a fifth embodiment of the present invention, and FIG. 5B shows the aberration curves of the fifth embodiment of the present invention. The photographing optical lens assembly of the fifth embodiment of the present invention mainly comprises three lens elements, in order from the object side to the image side: a plastic first lens element 500 with positive refractive power having a convex object-side surface 501 and a convex image-side surface 502, the object-side and image-side surfaces 501 and 502 thereof being aspheric; a plastic second lens element 510 with negative refractive power having a concave object-side surface 511 and a concave image-side surface 512, the object-side and image-side surfaces 511 and 512 thereof being aspheric, two inflection points formed on the image-side surface 512; a plastic third lens element 520 with positive refractive power having a convex object-side surface 521 and a concave image-side surface 522, the object-side and image-side surfaces 521 and 522 thereof being aspheric, at least one inflection point formed on the image-side surface 522; wherein a stop 530 is disposed between an imaged object and the first lens element 500; wherein the photographing optical lens assembly further provides an IR filter 540 disposed between the image-side surface 522 of the third lens element 520 and an image plane 550; and wherein the IR filter 540 is made of glass and have no influence on the focal length of the photographing optical lens assembly.

The equation of the aspheric surface profiles of the fifth embodiment has the same form as that of the first embodiment.

In the fifth embodiment of the present photographing optical lens assembly, the focal length of the photographing optical lens assembly is f, and it satisfies the relation: f=1.18 (mm).

In the fifth embodiment of the present photographing optical lens assembly, the f-number of the photographing optical lens assembly is Fno, and it satisfies the relation: Fno=2.04.

In the fifth embodiment of the present photographing optical lens assembly, half of the maximal field of view of the photographing optical lens assembly is HFOV, and it satisfies the relation: HFOV=30.5 deg.

In the fifth embodiment of the present photographing optical lens assembly, the Abbe number of the first lens element 500 is V1, the Abbe number of the second lens element 510 is V2, and they satisfy the relation: V1−V2=32.5.

In the fifth embodiment of the present photographing optical lens assembly, the refractive index of the first lens element 500 is N1, the refractive index of the second lens element 510 is N2, and it satisfies the relation: |N1−N2|=0.088.

In the fifth embodiment of the present photographing optical lens assembly, the distance on the optical axis between the first lens element 500 and the second lens element 510 is T12, the distance on the optical axis between the second lens element 510 and the third lens element 520 is T23, and they satisfy the relation: T12/T23=1.46.

In the fifth embodiment of the present photographing optical lens assembly, the thickness on the optical axis of the third lens element 520 is CT3, the thickness on the optical axis of the second lens element 510 is CT2, and it satisfies the relation: CT3/CT2=1.74.

In the fifth embodiment of the present photographing optical lens assembly, the radius of curvature of the object-side surface 501 of the first lens element 500 is R2, the radius of curvature of the image-side surface 502 of the first lens element 500 is R2, and they satisfy the relation: R1/R2=−0.58.

In the fifth embodiment of the present photographing optical lens assembly, the radius of curvature of the object-side surface 511 of the second lens element 510 is R3, the radius of curvature of the image-side surface 512 of the second lens element 510 is R4, and they satisfy the relation: R3/R4=−0.19.

In the fifth embodiment of the present photographing optical lens assembly, the radius of curvature of the object-side surface 521 of the third lens element 520 is R5, the radius of curvature of the image-side surface 522 of the third lens element 520 is R6, and they satisfy the relation: R5/R6=0.35.

In the fifth embodiment of the present photographing optical lens assembly, the focal length of the photographing optical lens assembly is f, the focal length of the first lens element 500 is f1, the focal length of the second lens element 510 is F2, the focal length of the third lens element 520 is f3, and they satisfy the relation: |f/f1|+|f/f2|+|f/f3|=3.27.

In the fifth embodiment of the present photographing optical lens assembly, the distance between the first inflection point on the image-side surface 512 of the second lens element 510 and the optical axis is y"1, the distance between the second inflection point on the image-side surface 512 of the second lens element 510 and the optical axis is y"2, the distance between the effective radius of the image-side surface 512 of the second lens element 510 and the optical axis is Y, and they satisfy the relation: y"1/Y=0.16; y"2/Y=0.62.

In the fifth embodiment of the present photographing optical lens assembly, the distance on the optical axis between the object-side surface 501 of the first lens element 500 and the image-side surface 522 of the third lens element 520 is Td, the distance on the optical axis between the object-side surface 501 of the first lens element 500 and the electronic sensor is TTL, and they satisfy the relation: Td/TTL=0.64.

In the fifth embodiment of the present photographing optical lens assembly, the distance on the optical axis between the stop 530 and the electronic sensor is SL, the distance on the optical axis between the object-side surface 501 of the first lens element 500 and the electronic sensor is TTL, and they satisfy the relation: SL/TTL=0.98.

In the fifth embodiment of the present photographing optical lens assembly, the distance on the optical axis between the object-side surface 501 of the first lens element 500 and the electronic sensor is TTL, half of the diagonal length of the effective pixel area of the electronic sensor is ImgH, and they satisfy the relation: TTL/ImgH=2.40.

The detailed optical data of the fifth embodiment is shown in FIG. 14 (TABLE 9), and the aspheric surface data is shown in FIG. 15 (TABLE 10), wherein the units of the radius of curvature, the thickness and the focal length are expressed in mm, and HFOV is half of the maximal field of view.

It is to be noted that TABLES 1-10 (illustrated in FIGS. 6-15 respectively) show different data of the different embodiments, however, the data of the different embodiments are obtained from experiments. Therefore, any photographing optical lens assembly of the same structure is considered to be within the scope of the present invention even if it uses different data. The embodiments depicted above and the appended drawings are exemplary and are not intended to limit the claim scope of the present invention. TABLE 11 (illustrated in FIG. 16) shows the data of the respective embodiments resulting from the equations.

What is claimed is:

1. A photographing optical lens assembly comprising, in order from an object side to an image side:
   a first lens element with positive refractive power having a convex object-side surface;
   a second lens element with negative refractive power having a concave object-side surface and a concave image-side surface, the object-side and image-side surfaces thereof being aspheric;
   a third lens element having a concave image-side surface, the object-side and image-side surfaces thereof being aspheric, at least one inflection point formed on the image-side surface; and
   wherein there are three lens elements with refractive power; and wherein a distance on the optical axis between the first and second lens elements is T12, a distance on the optical axis between the second and third lens elements is T23, a thickness on the optical axis of the second lens element is CT2, a thickness on the optical axis of the third lens element is CT3, a radius of curvature on the object-side surface of the first lens element is R1, a radius of curvature on the image-side surface of the first lens element is R2, a radius of curvature on the object-side surface of the second lens element is R3, a radius of curvature on the image-side surface of the second lens element is R4, and they satisfy the relations:

$0.40 < T12/T23 < 2.35;$ $0.50 < CT3/CT2 < 1.65;$ $-2.00 < R1/R2 < 0.50;$ $-3.20 < R3/R4 < 0.00.$

2. The photographing optical lens assembly according to claim 1, wherein at least an inflection point is formed on the image-side surface of the second lens element, a distance between the inflection point on the image-side surface of the second lens element and the optical axis is y", a distance between the effective radius position on the image-side surface of the second lens element and the optical axis is Y, and they satisfy the relation: $0.03 < y''/Y < 0.50$.

3. The photographing optical lens assembly according to claim 1, wherein the third lens element has a convex object-side surface, the second and the third lens elements are made of plastic materials.

4. The photographing optical lens assembly according to claim 3, wherein the photographing optical lens assembly further provides a stop and an electronic sensor for image formation, the stop is disposed between the imaged object and the second lens element, the electronic sensor is disposed at the image plane, a distance on the optical axis between the stop and the electronic sensor is SL, a distance on the optical axis between the object-side surface of the first lens element and the electronic sensor is TTL, and they satisfy the relation: $0.70 < SL/TTL < 1.20$.

5. The photographing optical lens assembly according to claim 4, wherein an Abbe number of the first lens element is V1, an Abbe number of the second lens element is V2, and they satisfy the relation: $31.0 < V1 - V2 < 42.0$.

6. The photographing optical lens assembly according to claim 5, wherein the radius of curvature of the object-side surface of the first lens element is R1, the radius of curvature of the image-side surface of the first lens element is R2, and they satisfy the relation: $-0.65 < R1/R2 < 0.45$.

7. The photographing optical lens assembly according to claim 6, wherein the stop is disposed between the imaged object and the first lens element, the distance on the optical axis between the stop and the electronic sensor is SL, the distance on the optical axis between the object-side surface of the first lens element and the electronic sensor is TTL, and they satisfy the relation: $0.87 < SL/TTL < 1.10$.

8. The photographing optical lens assembly according to claim 7, wherein a radius of curvature on the object-side surface of the third lens element is R5, a radius of curvature on the image-side surface of the third lens element is R6, and they satisfy the relation: $0.50 < R5/R6 < 1.00$.

9. The photographing optical lens assembly according to claim 4, wherein a focal length of the photographing optical lens assembly is f, a focal length of the first lens element is f1, a focal length of the second lens element is f2, a focal length of the third lens element is f3, and they satisfy the relation: $1.10 < |f/f1| + |f/f2| + |f/f3| < 3.30$.

10. The photographing optical lens assembly according to claim 9, wherein the focal length of the photographing optical lens assembly is f, the focal length of the first lens element is f1, the focal length of the second lens element is f2, the focal length of the third lens element is f3, and they satisfy the relation: $2.20 < |f/f1| + |f/f2| + |f/f3| < 3.00$.

11. The photographing optical lens assembly according to claim 9, wherein the radius of curvature on the object-side surface of the second lens element is R3, the radius of curvature on the image-side surface of the second lens element is R4, and they satisfy the relation: $-2.50 < R3/R4 < -0.12$.

12. The photographing optical lens assembly according to claim 4, wherein a distance on the optical axis between the object-side surface of the first lens element and the image-side surface of the third lens element is Td, the distance on the optical axis between the object-side surface of the first lens element and the electronic sensor is TTL, and they satisfy the relation: $0.40 < Td/TTL < 0.78$.

13. The photographing optical lens assembly according to claim 4, wherein the distance on the optical axis between the object-side surface of the first lens element and the electronic sensor is TTL, half of the diagonal length of an effective pixel area of the electronic sensor is ImgH, and they satisfy the relations: $TTL/ImgH < 1.85$.

14. A photographing optical lens assembly comprising, in order from an object side to an image side:
    a first lens element with positive refractive power having a convex object-side surface;
    a second lens element with negative refractive power having a concave object-side surface and a concave image-side surface, the object-side and image-side surfaces thereof being aspheric;
    a third lens element having a concave image-side surface, the object-side and image-side surfaces thereof being aspheric, at least one inflection point formed on the image-side surface; and
    wherein the photographing optical lens assembly further provides an electronic sensor for image formation at the image plane, and there are three lens elements with refractive power; wherein a distance on the optical axis between the first and second lens elements is T12, a distance on the optical axis between the second and third lens elements is T23, a focal length of the photographing optical lens assembly is f, a focal length of the first lens element is f1, a focal length of the second lens element is f2, a focal length of the third lens element is f3, a radius of curvature on the object-side surface of the second lens element is R3, a radius of curvature on the image-side surface of the second lens element is R4, a distance on the optical axis between the object-side surface of the first lens element and the image-side surface of the third lens element is Td, a distance on the optical axis between the object-side surface of the first lens element and the electronic sensor is TTL, and they satisfy the relations:

0.40<*T*12/*T*23<2.70;

1.10<|f/f1|+|f/f2|+|f/f3|<3.30;

−2.50<*R*3/*R*4<−0.12;

**0.40<*Td/TTL*<0.78.**

15. The photographing optical lens assembly according to claim 14, wherein the third lens element has a convex object-side surface, the second and third lens elements are made of plastic materials.

16. The photographing optical lens assembly according to claim 15, wherein an Abbe number of the first lens element is V1, an Abbe number of the second lens element is V2, and they satisfy the relation: 31.0<V1−V2<42.0.

17. The photographing optical lens assembly according to claim 15, wherein the photographing optical lens assembly further provides a stop, the stop is disposed between the imaged object and the first lens element, the distance on the optical axis between the stop and the electronic sensor is SL, the distance on the optical axis between the object-side surface of the first lens element and the electronic sensor is TTL, and they satisfy the relation: 0.87<SL/TTL<1.10.

18. The photographing optical lens assembly according to claim 17, wherein the focal length of the photographing optical lens assembly is f, the focal length of the first lens element is f1, the focal length of the second lens element is f2, the focal length of the third lens element is f3, and they satisfy the relation: 2.20<|f/f1|+|f/f2|+|f/f3|<3.00.

19. The photographing optical lens assembly according to claim 17, wherein the distance on the optical axis between the first and second lens elements is T12, the distance on the optical axis between the second and third lens elements is T23, and they satisfy the relation: 0.40<T12/T23<2.35.

20. The photographing optical lens assembly according to claim 17, wherein the radius of curvature on the object-side surface of the first lens element is R1, the radius of curvature on the image-side surface of the first lens element is R2, and they satisfy the relation: −2.00<R1/R2<0.50.

21. A photographing optical lens assembly comprising, in order from an object side to an image side:
a first lens element with positive refractive power having a convex object-side surface;
a second lens element having a concave image-side surface, the object-side and image-side surfaces thereof being aspheric, at least one inflection point formed on the image-side surface, made of plastic materials;
a third lens element having a concave image-side surface, the object-side and image-side surfaces thereof being aspheric, at least one inflection point formed on the image-side surface, made of plastic materials; and
wherein there are three lens elements with refractive power, a distance on the optical axis between the first and second lens elements is T12, a distance on the optical axis between the second and third lens elements is T23, a thickness on the optical axis of the second lens element is CT2, a thickness on the optical axis of the third lens element is CT3, a refractive index of the first lens element is N1, a refractive index of the second lens element is N2, a distance between the inflection point on the image-side surface of the second lens element and the optical axis is y", a distance between the effective radius position on the image-side surface of the second lens element and the optical axis is Y, and they satisfy the relations:

0.40<*T*12/*T*23<2.35;

0.50<*CT*3/*CT*2<1.65;

|*N*1−*N*2|<0.15;

0.03<*y"/Y*<0.50.

22. The photographing optical lens assembly according to claim 21, wherein the second lens element has a concave object-side surface, and the third lens element has a convex object-side surface.

23. The photographing optical lens assembly according to claim 22, wherein the photographing optical lens assembly further provides a stop and an electronic sensor for image formation, the stop is disposed between the imaged object and the second lens element, the electronic sensor is disposed at the image plane, the distance on the optical axis between the stop and the electronic sensor is SL, the distance on the optical axis between the object-side surface of the first lens element and the electronic sensor is TTL, and they satisfy the relation: 0.70<SL/TTL<1.20.

24. The photographing optical lens assembly according to claim 23, wherein an Abbe number of the first lens element is V1, an Abbe number of the second lens element is V2, and they satisfy the relation: 31.0<V1−V2<42.0.

25. The photographing optical lens assembly according to claim 23, wherein the radius of curvature on the object-side surface of the first lens element is R1, the radius of curvature on the image-side surface of the first lens element is R2, and they satisfy the relation: −0.65<R1/R2<0.45.

* * * * *